United States Patent
Hashemi

(10) Patent No.: US 10,798,636 B2
(45) Date of Patent: Oct. 6, 2020

(54) INTEGRATING SECTORIZED COMMUNICATION AND ROUTE DISCOVERY IN MULTI-HOP SYSTEMS

(71) Applicant: SONY CORPORATION, Tokyo (JP)

(72) Inventor: Morteza Hashemi, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/249,456

(22) Filed: Jan. 16, 2019

(65) Prior Publication Data

US 2020/0229067 A1 Jul. 16, 2020

(51) Int. Cl.
| | | |
|---|---|---|
| *H04W 40/24* | (2009.01) | |
| *H04B 7/0491* | (2017.01) | |
| *H04B 7/06* | (2006.01) | |
| *H04W 40/22* | (2009.01) | |
| *H04W 40/12* | (2009.01) | |
| *H04W 84/12* | (2009.01) | |

(52) U.S. Cl.
CPC ........ *H04W 40/246* (2013.01); *H04B 7/0491* (2013.01); *H04B 7/0617* (2013.01); *H04W 40/12* (2013.01); *H04W 40/22* (2013.01); *H04W 84/12* (2013.01)

(58) Field of Classification Search
CPC .... H04W 40/246; H04W 40/12; H04W 40/22
See application file for complete search history.

(56) References Cited

U.S. PATENT DOCUMENTS

| | | | | |
|---|---|---|---|---|
| 6,205,498 B1 * | 3/2001 | Habusha | ................. | H04L 47/10 379/229 |
| 6,519,712 B1 * | 2/2003 | Kim | .................... | G06F 11/1438 712/228 |
| 6,687,847 B1 * | 2/2004 | Aguilera | ............. | G06F 11/0715 714/15 |
| 6,880,100 B2 * | 4/2005 | Mora | .................... | H04L 67/104 709/224 |

FOREIGN PATENT DOCUMENTS

WO WO 2018/224916 A1 * 12/2018

* cited by examiner

*Primary Examiner* — Redentor Pasia
(74) *Attorney, Agent, or Firm* — O'Banion & Ritchey LLP; John P. O'Banion

(57) ABSTRACT

A wireless communication apparatus, system or method to perform directional wireless transmission (e.g., directional mmW) after establishing one or more routes. When valid routes are not available for sending route discovery, then sector sweeping (SSW) is performed which combines a routing request with the SSW frame sent in multiple sector directions for receipt by neighboring stations. These neighboring stations obtain the information from the SSW and its appended routing request and respond back to the initiator with an SSW to which may be appended a routing reply or a routing request. Beam refinement is performed by appending a training field onto a route request, which is responded to by appending a beam refinement reply onto a route reply.

20 Claims, 26 Drawing Sheets

| Element ID | Length | Active Path Selection Protocol Identifier | Active Path Selection Metric Identifier | Congestion Control Mode Identifier | Synchronization Method Identifier | Authentication Protocol Identifier | Mesh Formation Info | Mesh Capability |
|---|---|---|---|---|---|---|---|---|
| 1 | 1 | 1 | 1 | 1 | 1 | 1 | 1 | 1 |

Octets:

FIG. 4
(Prior Art)

| Frame control | Duration | RA | TA | SSW | SSW Feedback | FCS |
|---|---|---|---|---|---|---|
| 2 | 2 | 6 | 6 | 3 | 3 | 4 |

Octets:

**FIG. 7
(Prior Art)**

| B0 | B1  B9 | B10  B15 | B16  B17 | B18  B23 |
|---|---|---|---|---|
| Direction | CDOWN | Sector ID | DMG Antenna ID | RXSS Length |
| 1 | 9 | 6 | 2 | 6 |

Bits:

**FIG. 8
(Prior Art)**

| B0  B8 | B9  B10 | B11  B15 | B16 | B17  B23 |
|---|---|---|---|---|
| Total sectors in ISS | Number of RX DMG antennas | Reserved | Poll Required | Reserved |
| 9 | 2 | 5 | 1 | 7 |

Bits:

**FIG. 9A
(Prior Art)**

| B0  B5 | B6  B7 | B8  B15 | B16 | B17  B23 |
|---|---|---|---|---|
| Sector select | DMG Antenna select | SNR report | Poll Required | Reserved |
| 6 | 2 | 8 | 1 | 7 |

Bits:

**FIG. 9B
(Prior Art)**

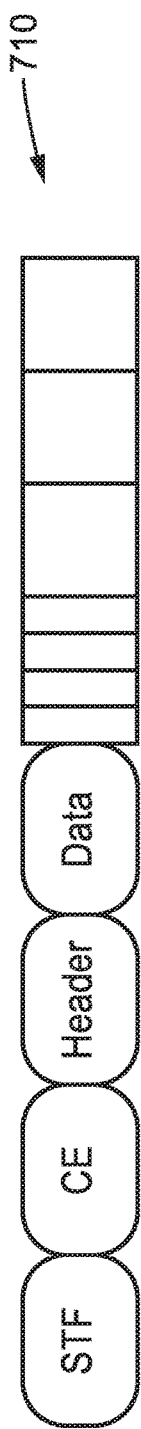
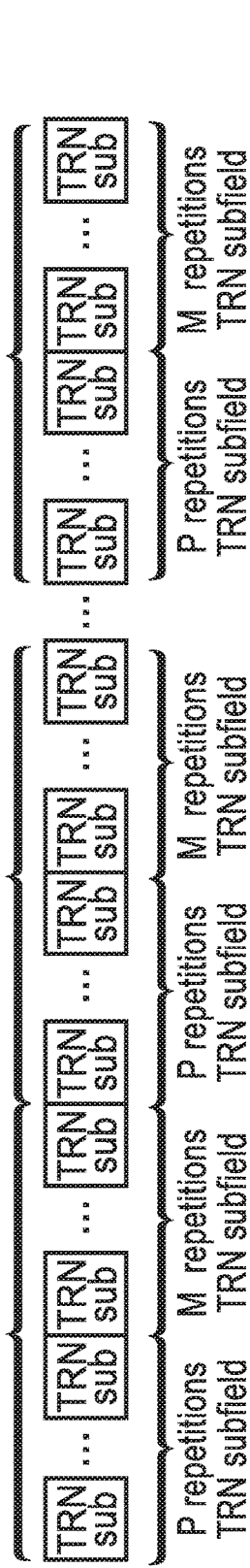
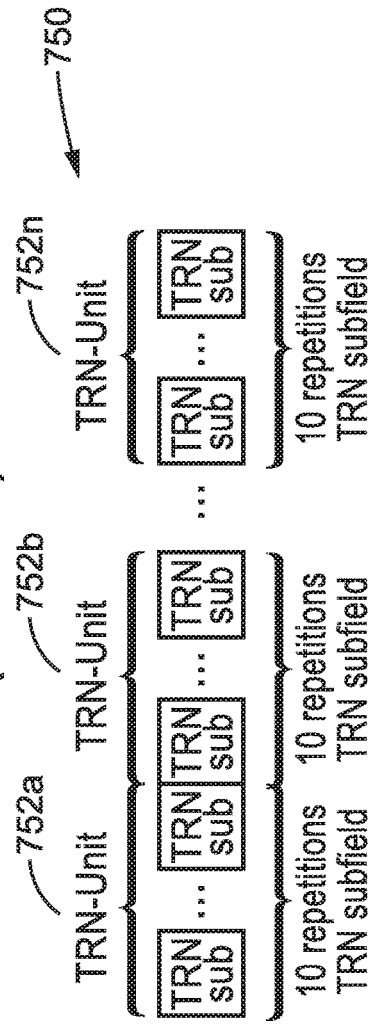
FIG. 46 (Prior Art)
FIG. 47 (Prior Art)
FIG. 48 (Prior Art)

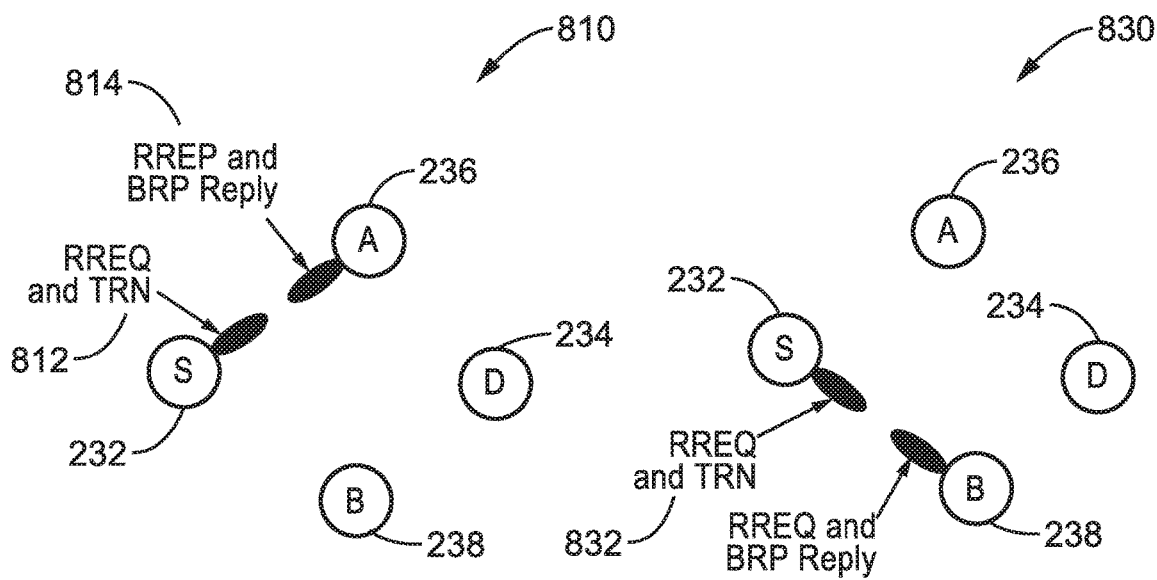
FIG. 51
FIG. 52
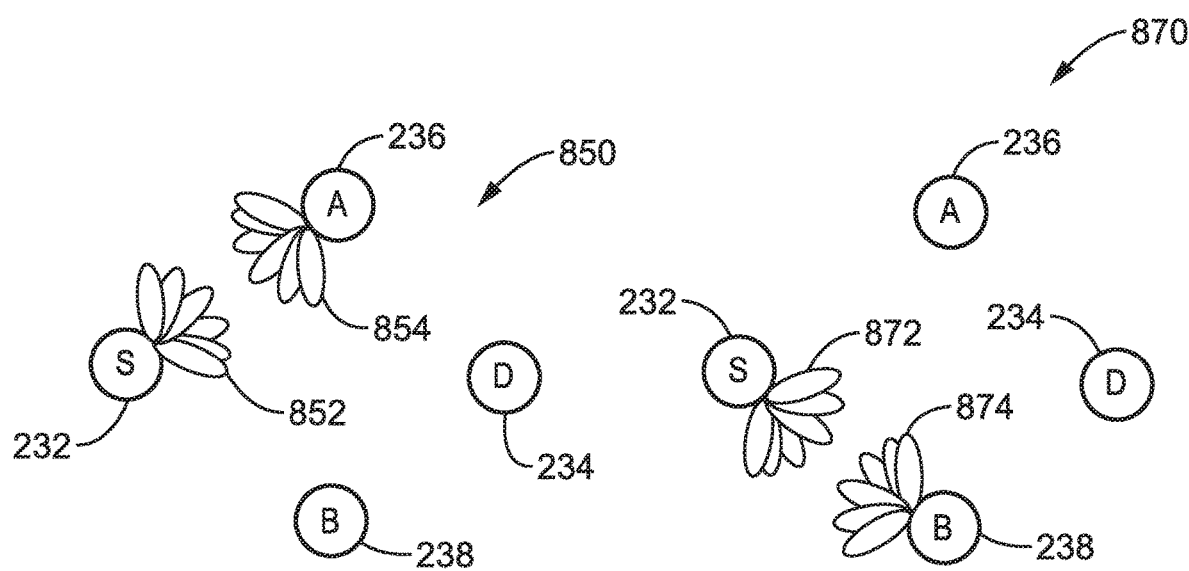
FIG. 53
FIG. 54

INTEGRATING SECTORIZED COMMUNICATION AND ROUTE DISCOVERY IN MULTI-HOP SYSTEMS

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless network communications, and more particularly to multiple-hop routing utilizing an integrated sectorized communication and route discovery process.

2. Background Discussion

In response to the widespread desire to provide higher capacity networks, network operators have begun to embrace various concepts to achieve densification. Current sub-6 GHz wireless technology is not sufficient to cope with high data demands. One alternative is to utilize additional spectrum in the 30-300 GHz band which is often referred to as the millimeter wave band (mmW).

To efficiently utilize mmW wireless networking systems generally requires properly dealing with channel impairments and propagation characteristics of these high frequency bands. High free-space path loss, high penetration, reflection and diffraction losses reduce available diversity and limit non-line-of-sight (NLOS) communications. Yet, the small wavelength of mmW enables the use of high-gain electronically steerable directional antennas of practical dimensions, which can provide sufficient array gain to overcome path loss and ensure a high Signal-to-Noise Ratio (SNR) at the receiver. Directional distribution networks (DNs) in dense deployment environments using mmW bands could be an efficient way for achieving reliable communications between stations (STAs) and overcoming line-of-sight channel restrictions.

When a new station (STA or node) is starting up it will be looking (searching) for neighboring STAs to discover in a network to be joined. The process of initial access of a STA to a network comprises scanning for neighboring STAs and discovering all active STAs in the local vicinity. This can be performed either through the new STA searching for a specific network or list of networks to join, or by the new STA sending a broadcast request to join any already established network that will accept the new STA.

A STA connecting to a distributed network (DN) needs to discover neighboring STAs to decide on the best way to reach a gateway/portal DN STAs and the capabilities of each of these neighboring STAs. The new STA examines every channel for possible neighboring STAs over a specific period of time. If no active STA is detected after that specific time, the new STA moves to test the next channel. When a STA is detected, the new STA collects sufficient information to configure its physical (PHY) layer (e.g., OSI model) for operation in the regulatory domain (IEEE, FCC, ETSI, MKK, etc.). This task is further challenging in mmW communications due to directional transmissions. The challenges in this process can be summarized as: (a) knowledge of surrounding STAs IDs; (b) knowledge of the best transmission pattern(s) for beamforming; (c) channel access issues due to collisions and deafness; and (d) channel impairments due to blockage and reflections. Designing a neighborhood discovery method to overcome some or all of the above is of utmost importance to enable pervasiveness of mmW D2D and DN technologies.

The majority of existing technologies for DN address discovery for networks operating in broadcast mode are not targeted to networks with directional wireless communications. In addition, those technologies which utilize directional wireless network communications often have very high overhead demands in regards to the generation of beacon signals. Still further, these technologies lack sufficient mechanisms for reducing the overhead and latencies involved with performing discovery.

Current mmW communication systems rely on directional communications to gain sufficient link budget between the transmitter (Tx) and the receiver (Rx). For a station to access the channel it first listens to check if the medium is either occupied or free. The listening phase is usually performed using a quasi-Omni antenna, and in many instances this results in channel access being blocked although the transmission or reception direction is not affected by actual directional signal.

The task of establishing a multi-hop communication network in mmW band is much more challenging due to directionality, compared with Omni-directional communications in low frequency band systems. The challenges in this process can be summarized as: (a) knowledge of surrounding nodes IDs; (b) knowledge of best transmission patterns for beamforming to neighbors; (c) channel access issues arising due to collisions and deafness; and (d) channel impairments due to blockage and reflections.

Current directional wireless communications technologies often suffer from high overheads when establishing links and routing paths over the network.

Accordingly, a need exists for enhanced mechanisms for efficiently establishing links and routing paths, including multiple-hop (multi-hop) paths, from a source to a destination station. The present disclosure fulfills these needs and provides additional benefits over previous technologies.

BRIEF SUMMARY

An apparatus and method are disclosed for a network station (STA) to integrate sectorized communications with route discovery in a multi-hop communications scenario. In situations in which a station (STA) does not have valid sector information when initiating a route request discovery process, then a joint sector sweep and route discovery operation is performed according to the disclosed protocol.

This integrated sector sweep and routing discovery process in at least one embodiment, incorporates the following elements. Toward initiating a joint route discovery and sector sweep process, route request frames are appended to each of the sectors within a sector sweep (SSW) operation. The station receiving sector sweep frames, extracts information from the sector sweep and from its embedded route request frame. Stations maintain information on (keep track of) route request messages having the best link metric. Route request discovery messages are communicated through the best sector if a sector sweep over a link has been previously determined and kept up to date (e.g., valid routing path).

Toward optimizing multi-hop communications, each station can apply beam refinement protocol (BRP) to fine tune their sector settings to reach neighbor STAs. In the disclosure these BRPs are integrated with route discovery messaging. The STA originating route discovery messages to establish a route towards the destination STA, is configured to append a training (TRN) field to the route discovery messages if beam refinement is desired. Upon receiving a route discovery message with appended TRN field, the responding station examines the TRN field and the STA embeds feedback (BRP frame feedback) containing examination results within any responsive route requests, or route replies, that it generates.

Wireless STAs communicating using directional communications (Tx/Rx) through multiple hops, perform sector sweep training to find the best direction to reach to neighbor STAs, and sends route discovery messages using best sector determined by the sector sweep handshaking to establish a route towards the destination STA.

In previous work of the inventor, alternate routes were maintained, but the process was not optimized by integration with operations utilized to setup sectorized communications.

The teachings of the present disclosure can be applied to wireless LAN (WLAN), wireless personal area networks (WPAN), device-to-device (D2D), peer-to-peer (P2P), mesh networks, and outdoor wireless communications. Thus, the disclosed technology can be utilized in a wide range of target applications, the following being provided by way of example and not limitation: Wi-Fi, WiGig, Wi-Fi type networks, Internet of things (IoT) applications, backhauling and fronthaul of data, indoor and outdoor distribution networks, mesh networks, next generation cellular networks with D2D communications, and so forth.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 4 is a data field diagram depicting a DN configuration element for an IEEE 802.11 WLAN.

FIG. 7 is a data field diagram depicting a sector sweep (SSW) frame element for IEEE 802.11ad.

FIG. 8 is a data field diagram depicting the SSW field within the SSW frame element for IEEE 802.11ad.

FIG. 9A and FIG. 9B are data field diagrams depicting SSW feedback fields shown when transmitted as part of an ISS in FIG. 9A, and when not transmitted as part of an ISS in FIG. 9B, as utilized for IEEE 802.11ad.

FIG. 46 is a data field diagram of showing a training (TRN) field within a BRP data frame.

FIG. 47 is a data field diagram of a training (TRN) field in a beam refinement protocol (BRP) transmit (TX) packet.

FIG. 48 is a data field diagram of a training (TRN) field in a beam refinement protocol (BRP) receive (RX) packet.

FIG. 51 is a network topology diagram showing integrating BRP training and response fields within route request and reply messages over an established directional link between station A and station S according to an embodiment of the present disclosure.

FIG. 52 is a network topology diagram showing integrating BRP training and response fields within route request and reply messages over an established directional link between station B and station S according to an embodiment of the present disclosure.

FIG. 53 is a network topology diagram showing sector sweeps between station A and station S according to an embodiment of the present disclosure.

FIG. 54 is a network topology diagram showing sector sweeps between station B and station S according to an embodiment of the present disclosure.

DETAILED DESCRIPTION

Figure 1:
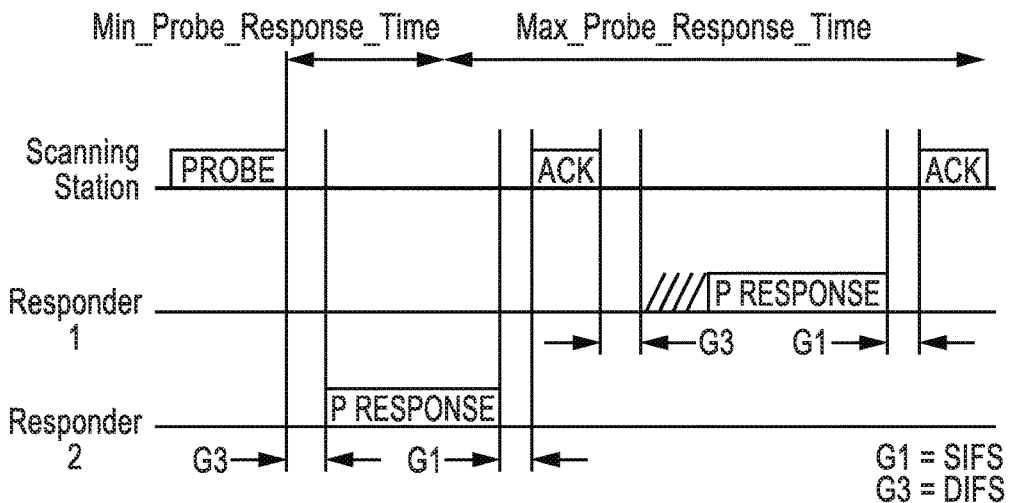
FIG. 1 is a timing diagram of active scanning performed in an IEEE 802.11 wireless local area network (WLAN).

The disclosure provides integration of sectorized communication and route discovery for directional multi-hop communications. In directional communications, sector sweeping is utilized for finding the best antenna sector for transmit (TX) and receive (RX) between any pair of stations (nodes) in the network. Moreover, in multi-hop communications, route discovery is utilized for establishing a multi-hop route from a source to a destination, such as either directly (source to destination), or multi-hop (through one or more intermediate stations). The disclosure describes multiple methods of combining sectorized communications and route discovery. In addition, the described protocol extension is usable in a wide range of wireless communications protocols, and is compatible with extensions including those for keeping track of multiple next-hop options to reach a destination station and thus make the routing protocol blockage resistant.

When used in this disclosure the following terms have the meanings generally described below.

AODV: Ad-hoc On-Demand Distance Vector (AODV) is a routing protocol designed for wireless and mobile ad-hoc networks for establishing on-demand routes to destinations.

Beamforming (BF): a directional transmission from a directional antenna system or array, and not an Omni-directional or quasi-Omni antenna, for determining information for improving received signal power or signal-to-noise ratio (SNR) at the intended receiver, and under which stations can obtain information for correlating time and directional allocation information.

BI: the Beacon Interval is a cyclic super frame period that represents the time between beacon transmission times.

BRP: Beam Refinement Protocol is a process for refining the directional sectors used for communication between a particular pair of nodes (stations).

BRP reply: Beam Refinement Protocol (BRP) reply is a message containing beam refinement information as sent in reply to receiving a training field (TRN) during BRP.

BSS: Basic Service Set, is a set of stations (STAs) that have successfully synchronized with an AP in the network. A component of the IEEE 802.11 WLAN architecture, built around a BSS which is actually a set of STAs connecting to the wireless medium allowing the STAs to communicate with each other.

BTI: Beacon Transmission Interval, is the interval between successive beacon transmissions.

CBAP: Contention-Based Access Period is the time period within the data transfer interval (DTI) of a directional multi-gigabit (DMG) BSS where contention-based enhanced distributed channel access (EDCA) is utilized.

CSMA/CA: is Carrier-Sense Multiple Access with Collision Avoidance is a network multiple access method in which carrier sensing is utilized.

DMG: Directional Multi-Gigabit are a form of high throughput wireless communications described in IEEE 802.

DN STA: distributed network (DN) station (DN STA) is a station (STA) that implements the DN facility. A DN STA that operates in the DN BSS may provide the distribution services for other DN STAs.

DTI: Data Transfer Interval is the period in which full BF training is permitted followed by actual data transfer. The DTI can include one or more service periods (SPs) and contention-based access periods (CBAPs).

FCS: is a Frame Check Sequence providing error-detecting code added to a frame in a communications protocol.

LOS: Line-of-Sight, a communication in which the transmitter and receiver are ostensibly within sight of one another, and not the result of communication of a reflected signal. The opposite condition is NLOS for non-line-of-sight, wherein stations are not in LOS with one another.

MAC address: a Medium Access Control (MAC) address.

MBSS: Mesh Basic Service Set is a basic service set (BSS) that forms a self-contained network of distributed network (DN) Stations (DN STAs) which may be used as a distribution system (DS).

NAV information: is information for a virtual carrier-sensing mechanism used with wireless network protocols, such as IEEE 802.11.

Omni-directional: a mode of transmission utilizing a non-directional antenna.

Quasi-Omni directional: is a mode of communication utilizing a directional multi-gigabit (DMG) antenna with the widest beamwidth attainable.

RA: is the Recipient Address to which data is to be communicated.

RREP: Routing Reply; a message frame that is generated by the destination STA and contains information about the originating STA.

RREQ: Routing request; a message frame that is generated by the originating STA and contains information about the destination STA.

RREQU: Routing Request Update; a message frame generated for obtaining information from neighboring STAs to updating routing information.

RREPU: Routing Reply Update; a message frame generated for replying to an RREQU.

Receive sector sweep (RXSS): Reception of Sector Sweep (SSW) frames via (across) different sectors, in which a sweep is performed between consecutive receptions.

RSSI: receive signal strength indicator (in dBm).

SLS: Sector-level Sweep phase is a BF training phase that can include as many as four components: an Initiator Sector Sweep (ISS) to train the initiator, a Responder Sector Sweep (RSS) to train the responder link, such as using SSW Feedback and an SSW ACK.

SNR: received Signal-to-Noise Ratio in dB.

SP: Service Period is the time period that is scheduled by the access point (AP), with scheduled SPs starting at fixed intervals of time.

Spectral efficiency: the information rate that can be transmitted over a given bandwidth in a specific communication system, usually expressed in bits per second, or in Hertz.

SREQ: Status Request; a message frame that is generated by each STA and is used to check if the next-hop STAs are alive and the routing table entries are valid. SREQ is also used to update the link metric.

SREP: Status Reply; a message frame that is generated in response to the status request (SREQ) message.

SSID: service Set Identifier is the name assigned to a WLAN network.

STA: Station (or node) is a logical entity that is a singly addressable instance of a medium access control (MAC) and physical layer (PHY) interface to the wireless medium (WM).

Sweep: a sequence of transmissions, separated by a short beamforming interframe space (SBIFS) interval, in which the antenna configuration at the transmitter or receiver is changed between transmissions.

SSW: Sector Sweep, is an operation in which transmissions are performed in different sectors (directions) and information collected on received signals, strengths and so forth.

TDD: Time Division Duplex allows the communication link to be duplexed, in which uplink is separated from downlink by the allocation of different time slots in the same frequency band, to adjust for different uplink and downlink data transmission flows.

TDD SP: Time Division Duplexing Service Period is a service period with TDD channel access, in which the TDD SP comprises a sequence of TDD intervals that, in turn, comprise a sequence of TDD slots.

TRN: a Training field used in beam refinement protocol (BRP) training.

Transmit Sector Sweep (TXSS): is transmission of multiple Sector Sweep (SSW) or Directional Multi-gigabit (DMG) Beacon frames via different sectors, in which a sweep is performed between consecutive transmissions.

1. Existing Directional Wireless Network Technology

1.1. WLAN Systems

In WLAN systems, such as 802.11, there are defined two modes of scanning; passive and active scanning. The following are the characteristics of passive scanning. (a) A new station (STA) attempting to join a network, examines each channel and waits for beacon frames for up to MaxChannelTime. (b) If no beacon is received, then the new STA moves to another channel, thus saving battery power since the new STA does not transmit any signal in scanning mode. The STA should wait enough time at each channel so that it does not miss the beacons. If a beacon is lost, the STA should wait for another beacon transmission interval (BTI).

The following are the characteristics of active scanning. (a) A new STA wanting to join a local network sends probe request frames on each channel, according to the following. (a)(1) The new STA moves to a channel, waits for incoming frames or a probe delay timer to expire. (a)(2) If no frame is detected after the timer expires, the channel is considered to not be in use. (a)(3) If a channel is not in use, the STA moves to a new channel. (a)(4) If a channel is in use, the STA gains access to the medium using regular DCF and sends a probe request frame. (a)(5) The STA waits for a desired period of time (e.g., Minimum Channel Time) to receive a response to the probe request if the channel was never busy. The STA waits for more time (e.g., Maximum Channel Time) if the channel was busy and a probe response was received.

(b) A Probe Request can use a unique service set identifier (SSID), list of SSIDs or a broadcast SSID. (c) Active scanning is prohibited in some frequency bands. (d) Active scanning can be a source of interference and collision, especially if many new STAs arrive at the same time and are attempting to access the network. (e) Active scanning is a faster way (less delay) for STAs to gain access to the network compared to the use of passive scanning, since STAs do not need to wait for beacons. (f) In the infrastructure basic service set (BSS) and IBSS, at least one STA is awake to receive and respond to probes. (g) STAs in a distributed network (DN) basic service set (MBSS) might not be awake at any point of time to respond. (h) When radio measurement campaigns are active, STAs might not answer the probe requests. (i) Collision of probe responses can arise. STAs might coordinate the transmission of probe responses by allowing the STA that transmitted the last beacon to transmit the first Probe Response. Other STAs can follow and use back-off times and regular distributed coordination function (DCF) channel access to avoid collision.

FIG. 1 depicts the use of active scanning in an IEEE 802.11 WLAN, depicting a scanning station sending a probe and two responding stations which receive and respond to the probe. The figure also shows the minimum and maximum probe response timing. The value G1 is shown set to SIFS which is the interframe spacing prior to transmission of an acknowledgment, while value G3 is DIFS which is DCF interframe spacing, represented the time delay for which a sender waits after completing a backoff period before sending an RTS package.

1.2. IEEE 802.11s Distributed Network (DN) WLAN

IEEE 802.11s (hereafter 802.11s) is a standard that adds wireless mesh networking capabilities to the 802.11 standard. In 802.11s new types of radio stations are defined as well as new signaling to enable mesh network discovery, establishing peer-to-peer connection, and routing of data through the mesh network.

Figure 2:
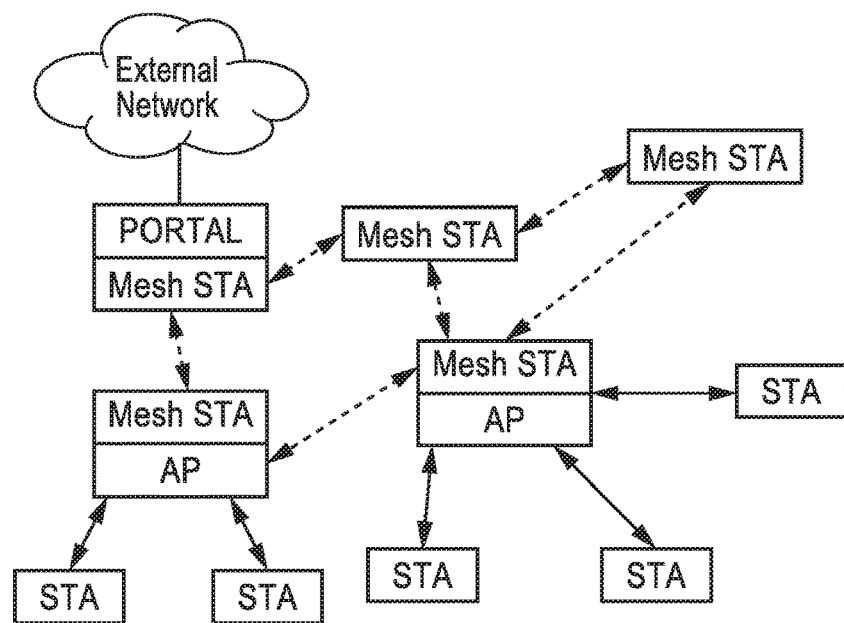
FIG. 2 is a station (STA) diagram for a Distributed Network (DN) showing a combination of DN and non-DN stations.

FIG. 2 illustrates one example of a mesh network where a mix of non-mesh STA connect to Mesh-STA/AP (solid lines) and Mesh STAs connect to other mesh STA (dotted lines) including a mesh portal. Nodes in mesh networks use the same scanning techniques defined in the 802.11 standard for discovering neighbors. The identification of the mesh network is given by the Mesh ID element contained in the Beacon and the Probe Response frames. In one mesh network, all mesh STAs use the same mesh profile. Mesh profiles are considered the same if all parameters in the mesh profiles match. The mesh profile is included in the Beacon and Probe Response frames, so that the mesh profile can be obtained by its neighbor mesh STAs through the scan.

When a mesh STA discovers a neighbor mesh STA through the scanning process, the discovered mesh STA is considered a candidate peer mesh STA. It may become a member of the mesh network, of which the discovered mesh STA is a member, and establish a mesh peering with the neighbor mesh STA. The discovered neighbor mesh STA may be considered a candidate peer mesh STA when the mesh STA uses the same mesh profile as the received Beacon or Probe Response frame indicates for the neighbor mesh STA.

The mesh STA attempts to maintain the discovered neighbor's information in a Mesh Neighbors Table which includes: (a) neighbor MAC address; (b) operating channel number; and (c) the most recently observed link status and quality information. If no neighbors are detected, the mesh STA adopts the Mesh ID for its highest priority profile and remains active. All the previous signaling to discover neighbor mesh STAs are performed in broadcast mode. It should be appreciated that 802.11s was not targeted for networks with directional wireless communications.

Figure 3:
FIG. 3 is a data field diagram depicting a DN identification element for an IEEE 802.11 WLAN.

FIG. 3 depicts a Mesh Identification element (Mesh ID element) which is used to advertise the identification of a Mesh Network. Mesh ID is transmitted in a Probe request, by a new STA willing to join a mesh network, and in beacon and signals, by existing mesh network STAs. A Mesh ID field of length 0 indicates the wildcard Mesh ID, which is used within a Probe Request frame. A wildcard Mesh ID is a specific ID that prevents a non-mesh STA from joining a mesh network. It should be recognized that a mesh station is a STA that has more features than a non-mesh station, for example a mesh network is like having the STA running as a module in additional to some other modules to serve the mesh functionality. If the STA does not have this mesh module it should not be allowed to connect to a mesh network.

FIG. 4 depicts a Mesh configuration element as contained in Beacon frames and Probe Response frames transmitted by mesh STAs, and it is used to advertise mesh services. The main contents of the Mesh Configuration elements are: (a) a path selection protocol identifier; (b) a path selection metric identifier; (c) a congestion control mode identifier; (d) a synchronization method identifier; and (e) an authentication protocol identifier. The contents of the Mesh Configuration Element together with the Mesh ID form a mesh profile.

The 802.11a standard defines many procedures and mesh functionalities including: mesh discovery, mesh peering management, mesh security, mesh beaconing and synchronization, mesh coordination function, mesh power management, mesh channel switching, three address, four address, and extended address frame formats, mesh path selection and forwarding, interworking with external networks, intra-mesh congestion control and emergency service support in mesh BSS.

1.3. Millimeter Wave in WLAN

WLANs in millimeter wave bands generally require the use of directional antennas for transmission, reception or both, to account for the high path loss and to provide sufficient SNR for communication. Using directional antennas in transmission or reception makes the scanning process directional as well. IEEE 802.11ad and the new standard 802.11ay define procedures for scanning and beamforming for directional transmission and reception over the millimeter wave band.

1.4. IEEE 802.11Ad Scanning and BF Training

An example of a mmW WLAN state-of-the-art system is the 802.11ad standard.

1.4.1. Scanning

A new STA operates on passive or active scanning modes to scan for a specific SSID, a list of SSIDs, or all discovered SSIDs. To passively scan, a STA scans for DMG beacon frames containing the SS ID. To actively scan: a DMG STA transmits Probe Request frames containing the desired SSID or one or more SSID List elements. The DMG STA might also have to transmit DMG Beacon frames or perform beamforming training prior to the transmission of Probe Request frames.

1.4.2. BF Training

BF training is a bidirectional sequence of BF training frame transmissions that uses a sector sweep and provides the necessary signaling to allow each STA to determine appropriate antenna system settings for both transmission and reception.

The 802.11ad BF training process can be performed in three phases. (1) A sector level sweep phase is performed whereby directional transmission with low gain (quasi-Omni) reception is performed for link acquisition. (2) A refinement stage is performed that adds receive gain and final adjustment for combined transmit and receive. (3) Tracking is then performed during data transmission to adjust for channel changes.

1.4.3. 802.11ad SLS BF Training Phase

This SLS BF Training Phase focuses on the sector level sweep (SLS) mandatory phase of the 802.11ad standard. During SLS, a pair of STAs exchange a series of sector sweep (SSW) frames (or beacons in case of transmit sector training at the PCP/AP) over different antenna sectors to find the one providing highest signal quality. The station that transmits first is called the initiator; the station that transmits second is referred to as the responder.

During a transmit sector sweep (TXSS), SSW frames are transmitted on different sectors while the pairing STA (the responder) receives utilizing a quasi-Omni directional pattern. The responder determines the antenna array sector from the initiator which provided the best link quality (e.g. SNR).

Figure 5:
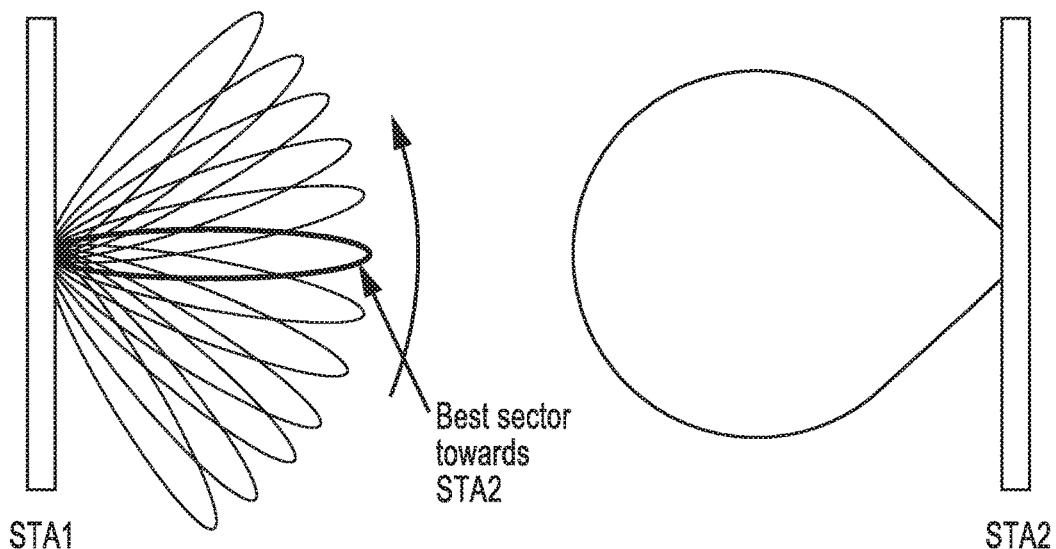
FIG. 5 is a schematic of antenna sector sweeping (SSW) in the IEEE 802.11ad protocol.

FIG. 5 depicts the concept of sector sweep (SSW) in 802.11ad. In this figure, an example is given in which STA 1 is an initiator of the SLS and STA 2 is the responder. STA 1 sweeps through all of the transmit antenna pattern fine sectors while STA 2 receives in a quasi-Omni pattern. STA 2 feeds back to STA 2 the best sector it received from STA 1.

Figure 6:
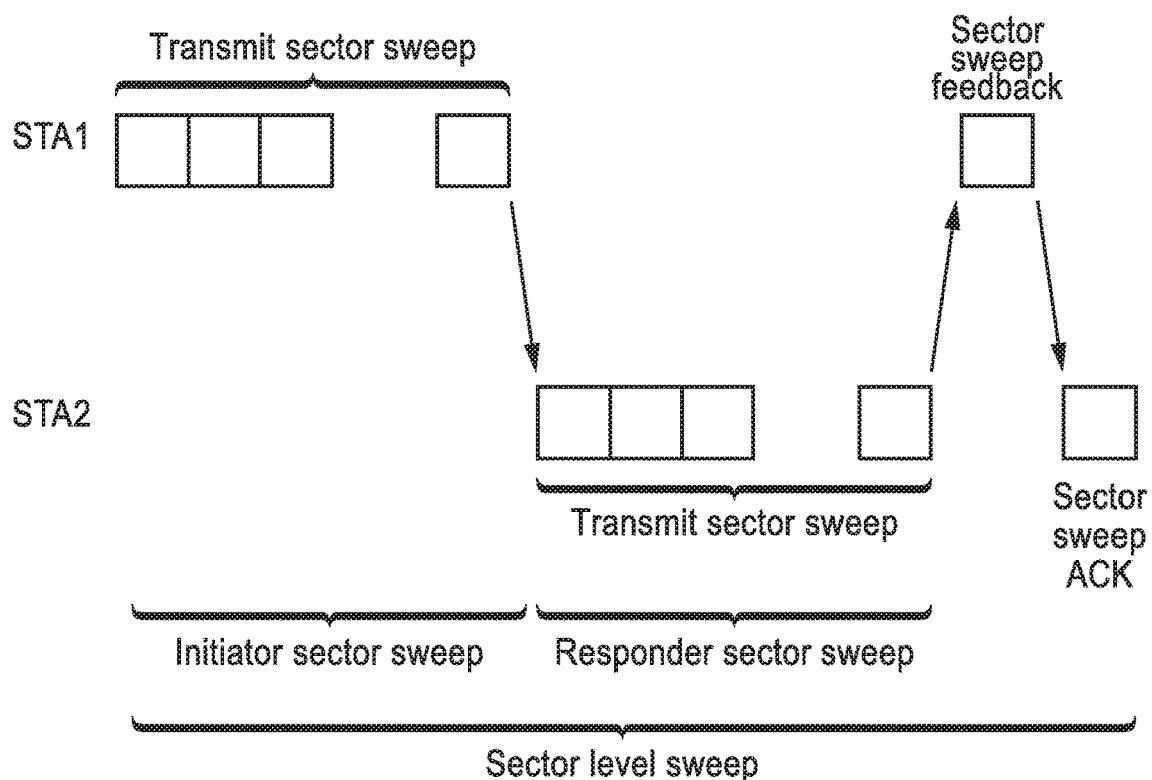
FIG. 6 is a signaling diagram showing signaling of sector-level sweeping (SLS) in the IEEE 802.11ad protocol.

FIG. 6 illustrates the signaling of the sector-level sweep (SLS) protocol as implemented in 802.11ad specifications. Each frame in the transmit sector sweep includes information on sector countdown indication (CDOWN), a Sector ID, and an Antenna ID. The best Sector ID and Antenna ID information are fed back with the Sector Sweep Feedback and Sector Sweep ACK frames.

FIG. 7 depicts the fields for the sector sweep frame (an SSW frame) as utilized in the 802.11ad standard, with the fields outlined below. The Duration field is set to the time until the end of the SSW frame transmission. The RA field contains the MAC address of the STA that is the intended receiver of the sector sweep. The TA field contains the MAC address of the transmitter STA of the sector sweep frame.

FIG. 8 illustrates data elements within the SSW field. The principle information conveyed in the SSW field is as follows. The Direction field is set to 0 to indicate that the frame is transmitted by the beamforming initiator and set to 1 to indicate that the frame is transmitted by the beamforming responder. The CDOWN field is a down-counter indicating the number of remaining DMG Beacon frame transmissions to the end of the TXSS. The sector ID field is set to indicate sector number through which the frame containing this SSW field is transmitted. The DMG Antenna ID field indicates which DMG antenna the transmitter is currently using for this transmission. The RXSS Length field is valid only when transmitted in a CBAP and is reserved otherwise. This RXSS Length field specifies the length of a receive sector sweep as required by the transmitting STA, and is defined in units of a SSW frame. The SSW Feedback field is defined below.

FIG. 9A and FIG. 9B depict SSW feedback fields. The format shown in FIG. 9A is utilized when transmitted as part of an Internal Sublayer Service (ISS), while the format of FIG. 9B is used when not transmitted as part of an ISS. The Total Sectors in the ISS field indicate the total number of sectors that the initiator uses in the ISS. The Number of Rx DMG Antennas subfield indicates the number of receive DMG antennas the initiator uses during a subsequent Receive Sector Sweep (RSS). The Sector Select field contains the value of the Sector ID subfield of the SSW field within the frame that was received with best quality in the immediately preceding sector sweep. The DMG Antenna Select field indicates the value of the DMG Antenna ID subfield of the SSW field within the frame that was received with best quality in the immediately preceding sector sweep. The SNR Report field is set to the value of the SNR from the frame that was received with best quality during the immediately preceding sector sweep, and which is indicated in the sector select field. The poll required field is set to 1 by a non-PCP/non-AP STA to indicate that it requires the PCP/AP to initiate communication with the non-PCP/non-AP. The Poll Required field is set to 0 to indicate that the non-PCP/non-AP has no preference about whether the PCP/AP initiates the communication.

1.5. AODV Routing Protocol

Figure 10A:
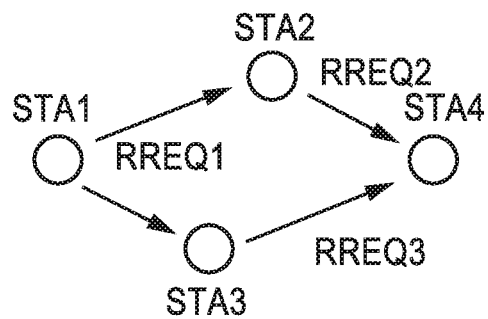
FIG. 10A through FIG. 10C is a network topology diagram of an Ad-hoc On-Demand Distance Vector (AODV) routing protocol.
Figure 10B:
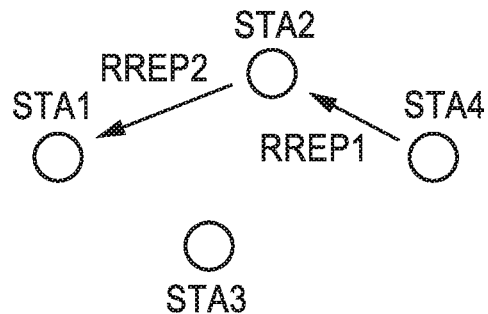
Figure 10C:
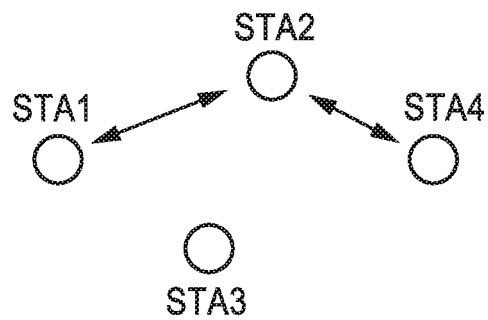

FIG. 10A through FIG. 10C illustrates an example of using an Ad-hoc On-Demand Distance Vector (AODV) routing protocol. A routing protocol is a set of rules to establish a communication path between an originating station (STA) and a destination STA over multiple hops (Intermediate STAs). AODV is a routing protocol which represents the general essence of current multi-hop routing over a wireless media. With AODV, STAs generates a route according to the following steps as seen in the example of FIG. 10A through FIG. 10C.

Steps 1 through 5 of this AODV routing process are see in FIG. 10A. (1) STA 1 is the originating STA and it broadcasts Routing Request (RREQ) frames (RREQ1). (2) STA 2 receives the RREQ1 and measures quality of the link between itself and the transmitter of the RREQ1 (STA 1), and rebroadcasts the RREQ embedding the link quality info and transmitting a routing request (RREQ2). (3) STA3 receives RREQ1, measures quality of the link between itself and transmitter of the RREQ1 (STA1), and rebroadcasts the RREQ embedding the link quality info (RREQ3). (4) STA4 as the destination STA receives RREQ2 from STA2, measures quality of the link between itself and the transmitter of the RREQ2 (STA2), and accumulates the value with link quality embedded in the RREQ2. In response to this process STA4 obtains information on the end-to-end quality to and from STA1 via STA2. (5) STA4 also receives an RREQ3 from STA3, measures quality of the link between itself and the transmitter of the RREQ3 (STA3), and accumulates the value with the link quality embedded in RREQ3. Accordingly, STA4 also obtains information on the end-to-end quality to and from STA1 via STA3.

Steps 6 through 8 of this AODV routing process are depicted in FIG. 10B. (6) STA4 determines that the link quality to STA1 via STA2 is better (e.g., higher signal-to-noise ratio (SNR)) than via STA3, and so STA4 transmits a routing response (RREP) frame (RREP1) to STA2 to confirm the best route to intermediate and originating STAs, and sets STA2 as the next hop STA toward STA1. (7) STA2 receives this RREP1 from STA4, and recognizes itself as an intermediate STA between STA4 and STA1, and set STA4 as its next hop STA toward STA4. (8) STA2 then further retransmits the RREP (RREP2) toward originating STA1, and sets STA1 as the next hop STA toward STA1.

Steps 9 through 10 of this AODV routing process are depicted in FIG. 10C. (9) STA1 receives RREP2 from STA2, and recognizes that the multi-hop path toward STA4 has been confirmed and the next hop STA to STA4 is STA2. (10) In response to the above sequence, a bidirectional route between STA1 and STA4 via STA2 is established.

2. Station (STA) Hardware Configuration of Disclosure

Figure 11:
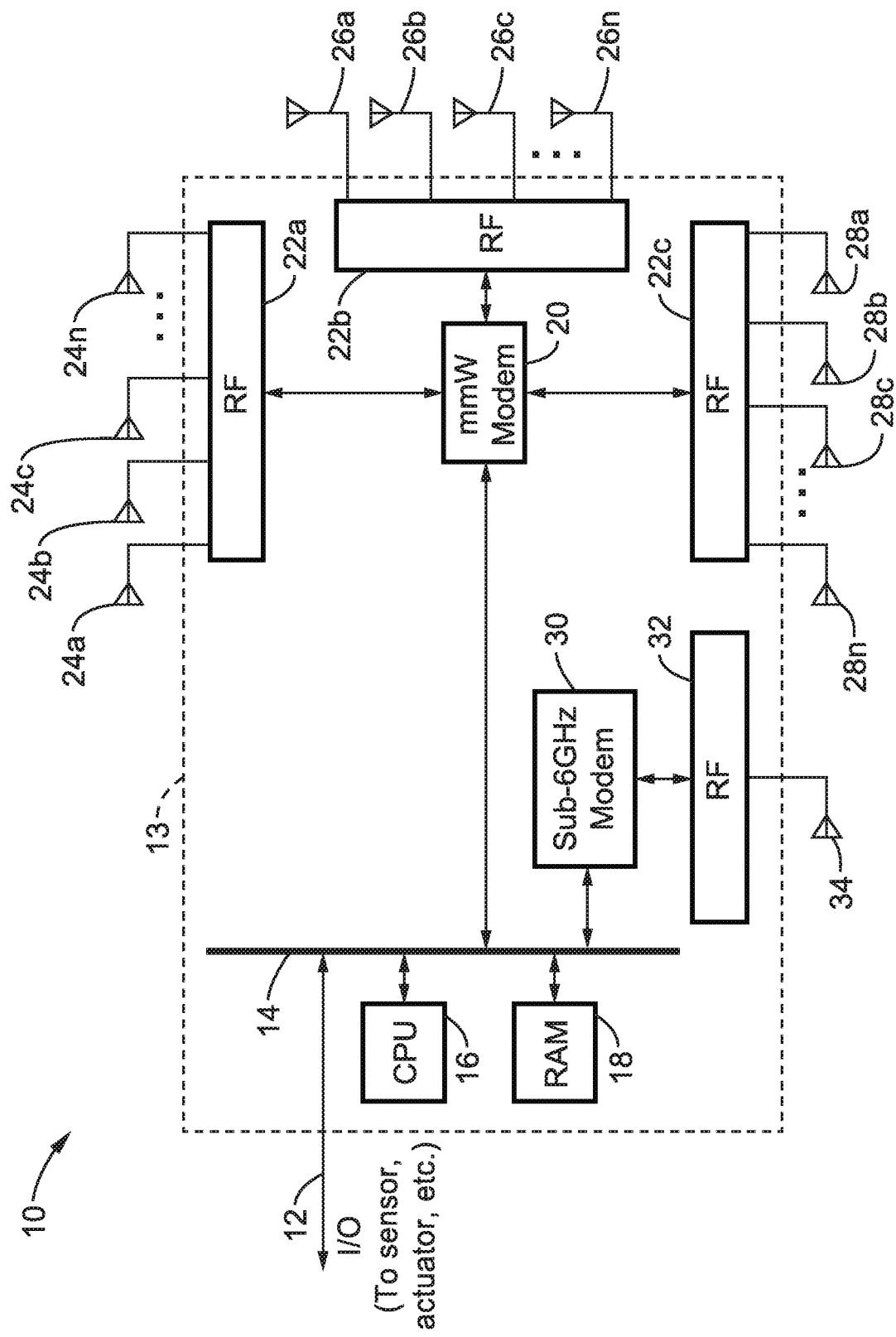
FIG. 11 is a block diagram of wireless mmW communication station hardware as utilized according to an embodiment of the present disclosure.

FIG. 11 illustrates an example embodiment 10 of STA hardware configuration showing I/O path 12 into hardware block 13, having a computer processor (CPU) 16 and memory (RAM) 18 coupled to a bus 14, which is coupled to I/O path 12 giving the STA external I/O, such as to sensors, actuators and so forth. Instructions from memory 18 are executed on processor 16 to execute a program which implements the communication protocols, which are executed to allow the STA to perform the functions of a "new STA", or one of the STAs already in the network. It should also be appreciated that the programming is configured to operate in different modes (source, intermediate, and destination), depending on what role it is playing in the current communication context. This host machine is shown configured with a mmW modem 20 coupled to radio-frequency (RF) circuitry 22a, 22b, 22c to a plurality of antennas 24a through 24n, 26a through 26n, 28a through 28n to transmit and receive frames with neighboring STAs. In addition, the host machine is also seen with a sub-6 GHz modem 30 coupled to radio-frequency (RF) circuitry 32 to antenna(s) 34.

Thus, this host machine is shown configured with two modems (multi-band) and their associated RF circuitry for providing communication on two different bands. By way of example and not limitation the intended directional communication band is implemented with a mmW band modem and its associated RF circuitries for transmitting and receiving data in the mmW band. The other band, generally referred to herein as the discovery band, comprises a sub-6 GHz modem and its associated RF circuitry for transmitting and receiving data in the sub-6 GHz band.

Although three RF circuits are shown in this example for the mmW band, embodiments of the present disclosure can be configured with modem 20 coupled to any arbitrary number of RF circuits. In general, using a larger number of RF circuits will result in broader coverage of the antenna beam direction. It should be appreciated that the number of RF circuits and number of antennas being utilized is determined by hardware constraints of a specific device. Some of the RF circuitry and antennas may be disabled when the STA determines it is unnecessary to communicate with neighbor STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

Figure 12:
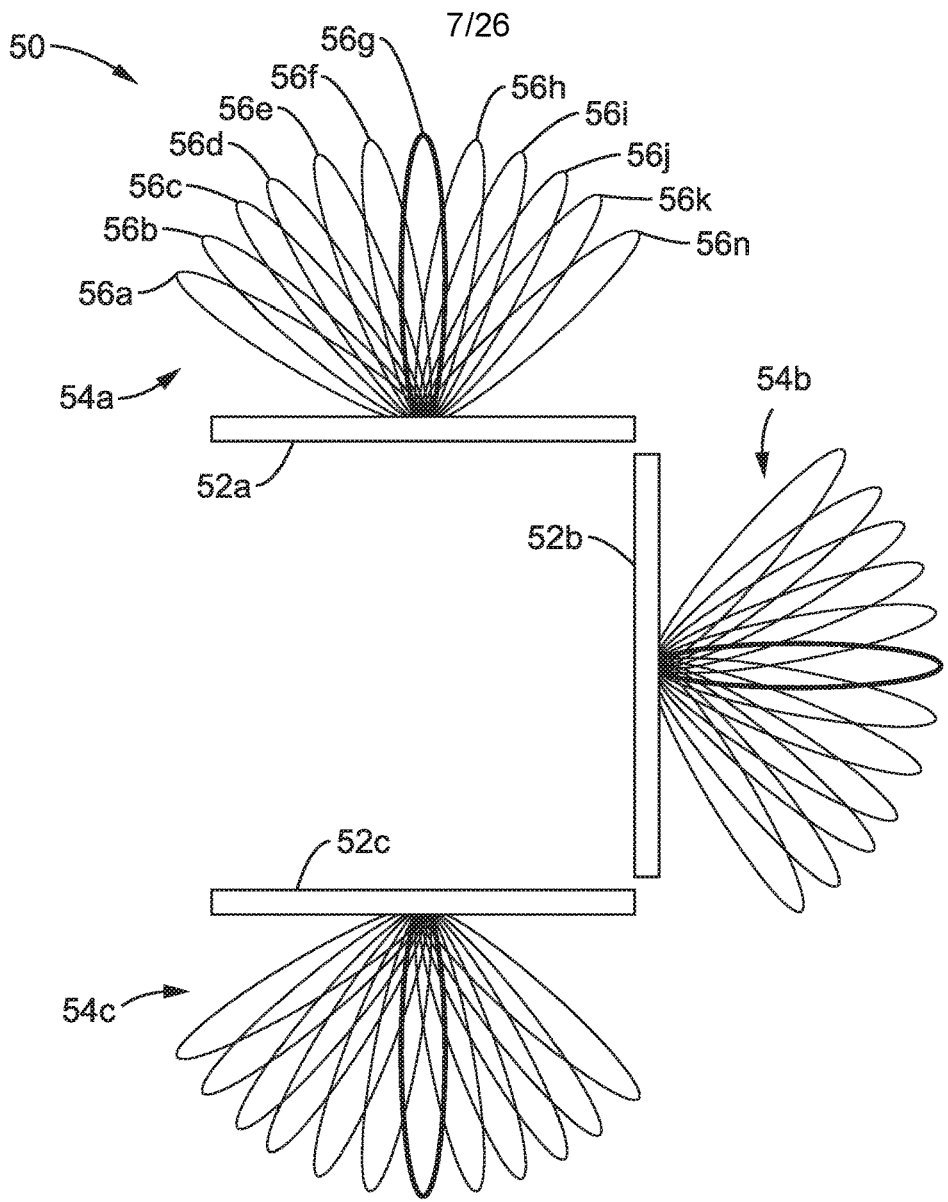
FIG. 12 is a mmW beam pattern diagram for the station hardware of FIG. 11 as utilized according to an embodiment of the present disclosure.

FIG. 12 illustrates an example embodiment 50 of mmW antenna directions which can be utilized by a STA to generate a plurality (e.g., 36) of mmW antenna sector patterns. In this example, the STA implements three RF circuits 52a, 52b, 52c and connected antennas, and each RF circuitry and connected antenna generate a beamforming pattern 54a, 54b, 54c. Antenna pattern 54a is shown having twelve beamforming patterns 56a, 56b, 56c, 56d, 56e, 56f, 56g, 56h, 56i, 56j, 56k and 56n ("n" representing that any number of patterns can be supported). The example station using this specific configuration has thirty six (36) antenna sectors, although the present disclosure can support any desired number of antenna sectors. For the sake of clarity and ease of explanation, the following sections generally exemplify STAs with a smaller number of antenna sectors, but this is not to be construed as an implementation limitation. It should be appreciated that any arbitrary beam pattern can be mapped to an antenna sector. Typically, the beam pattern is formed to generate a sharp beam, but it is possible that the beam pattern is generated to transmit or receive signals from multiple angles.

Antenna sector is determined by a selection of mmW RF circuitry and beamforming commanded by the mmW array antenna controller. Although it is possible that STA hardware components have different functional partitions from the one described above, such configurations can be deemed to be a variant of the explained configuration. Some of the mmW RF circuitry and antennas may be disabled when the STA determines it is unnecessary to communicate with neighbor STAs.

In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

Figure 13:
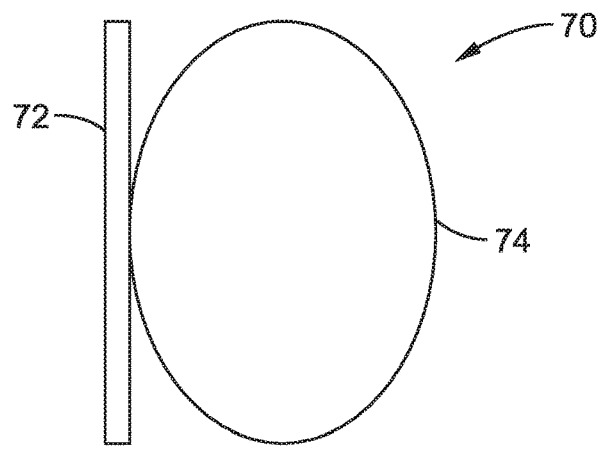
FIG. 13 is a beam pattern diagram for a discovery band communications antenna (i.e., sub-6 GHz), according to an embodiment of the present disclosure.

FIG. 13 illustrates an example embodiment 70 of antenna pattern for the sub-6 GHz modem assumed to use a quasi-Omni antenna 74 attached to its RF circuitry 72, although other circuitry and/or antennas may be utilized without limitation.

3. Quick Blockage Discovery and Recovery

It is important in numerous wireless applications to quickly detect and replace blocked links in order to avoid an interruption in data delivery. The majority of multi-hop routing protocols do not consider discovering and keeping track of multiple next-hop options when they set up routing protocols at the STAs. As a result, these existing wireless protocols incurred high delay and re-discovery overheads when the primary route is blocked. In contrast to this, a previous application by the inventor disclosed discovering next-hop options and maintaining them so that they are ready to be deployed at any time without any additional setup overhead under a blockage scenario.

To achieve the above objectives a new message flooding mechanism was taught utilizing route request (RREQ) and route reply (RREP) messages, to which were integrated route request update (RREQU) and route reply update (RREPU) messages in order to discover several routes between the originating STA and destination STA and maintain routing table entries, including primary and backup routes.

In typical multi-hop networking, a route from the originating STA to the destination STA is determined by selecting intermediate STAs for the end-to-end path. Often, the intermediate STAs are chosen which offer best link quality, as seen in the AODV example. However, in mmW, links are sensitive to blockage and other channel impairments. However, for time-sensitive applications, it is essential that the blocked link is quickly detected and replaced with an alternative link.

The present disclosure can be incorporated in various wireless protocols, including previous applications by the assignee describing multi-hop routing while maintaining multiple routing options (e.g., a primary and at least one backup option) to reach to the destination STA. In at least one of those previous applications the protocol was configured to automatically perform one or more courses of action in response to detecting erroneous situations listed as follows: (a) when a broken link is detected; and (b) when one of the next-hop options is not reachable and it needs to be replaced with another STA. Thus, the application taught multi-hop communications with multiple next-hop options and the ability to quickly discover and recover communications in response to error conditions, including: (a) under blockage scenario, a blocked STA would take a local action, when possible, and then it updates certain of its neighbor STAs with routing information; (b) each STA proactively assures that its routing table entries are up-to-date with multiple next-hop options that are reachable and ready to be deployed at any time. In this case, if a next-hop STA (either primary or backup) is not reachable (e.g., blocked), the STA sends a route request update to the complement set of its neighbors (excluding those STAs that are reachable) in order to find a replacement for the STA that is not reachable.

Therefore, the previous application provided a protocol for communication stations to discover and recover alternative routes under erroneous conditions. The present disclosure teaches the integration of sectorized communication with route discovery, which can be utilized with this and other wireless communication protocols. The discussion of integrating sectorized communication with route discovery in this present disclosure commences below at Section 5.

4. Neighbor Lists and Routing Tables

4.1. Neighbor List

Information obtained from performing the antenna sector sweep is utilized in the STA building a database, which is referred to herein as a Neighbor List, within which it stores received signal quality information for each antenna section for the STA in its memory. In at least one embodiment, each instance of the Neighbor List is also configured to store miscellaneous information on the neighbor STA. The object of the Neighbor List is to allow each STA to be made aware of its neighbor STAs so that the best transmit/receive sectors can be selected.

By way of example and not limitation, consider a field used for each neighbor with an entry in that field contains receive quality (RxQuality) for each direction for that station. For the previous topology example of FIG. 10A through FIG. 10C, it will be noted that STA 1 recognizes STA 2 and STA 3 as its neighbor STAs, and creates 2 instances of the Neighbor List entry. STA 1 then stores receive link quality information to RxQuality[N], where N is associated with Tx Antenna Sector of the neighbor STA.

4.2. Routing Table

In the following descriptions an originating station (source) is considered a station (STA) which initiates a communication to another station (STA) which is referred to as the destination station. Routing Tables are constructed as an outcome from the route discovery process, which will be explained in the later clause. Prior to transmitting a data frame to a destination STA, the originating STA sets up a route to the destination STA. The route to the destination STA is managed based on a Routing Table. The Routing Table contains a record (herein depicted in a column form) per destination STA, so that the originating STA can look up the record for the destination STA in preparation for transmitting a frame to the destination STA.

When a STA has a data frame to transmit to a destination STA, it looks up this destination in the Routing Table, and sets the Reception Address (RA) field of the frame to an address stored in NextHop. Each STA maintains a routing table which provides information on reaching destination STAs. Information for each destination STA is stored in a record (e.g., column) of the routing table. For instance in the examples described, each column of the routing table contains the following information: (a) Destination: indicating the destination STA address; (b) NextHop: which indicates the immediate next-hop STA in order to reach to the Destination STA; (c) Metric: is a value that determines distance to the destination STA using NextHop STA; (d) Lifetime: indicates the expiration time of routing information to use NextHop; (e) Backup NextHop: is the backup next-hop STA that can be used to reach to the Destination STA in case the NextHop is not reachable (e.g., due to blockage); (f) Backup Metric: is a value that determines distance to the destination STA if the backup next hop is deployed. (g) Backup Lifetime: indicates the expiration time of routing information to use Backup NextHop.

Figure 14:
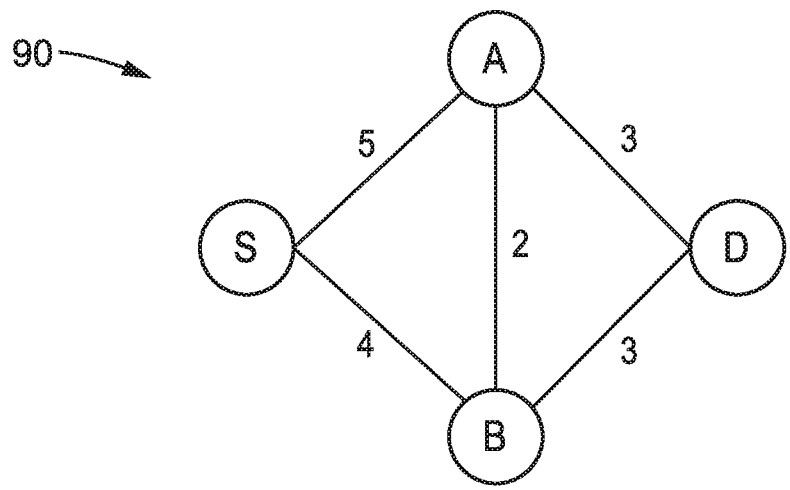
FIG. 14 is a network topology diagram of four example stations as utilized according to an embodiment of the present disclosure.

FIG. 14 illustrates an example network 90 showing a number of stations. It should be appreciated that this, and other topologies exemplified herein, are only presented by way of example as the present disclosure is not limited to the use of any specific network topology. In the figure each edge represents a bi-directional link between two nodes and is labeled with a link metric, specifically in this case the distance of that edge between stations. The source STA is marked as "S" and destination STA is marked as "D".

4.3. Forwarding Tables

Each STA has one Forwarding Table through which it keeps track of the type of frames (RREQ or RREP) that it has forwarded to its neighbor STAs along with the sequence number and metric of the message. The forwarding Table has one column (record) per neighbor STA, and in at least one example embodiment it contains the following elements. (a) Neighbor: is the address of the neighbor STA. (b) OrigSTA: is the originating STA of the routing management frame that has been forwarded to the Neighbor node. (c) SeqNum: is the Sequence number of the routing management frame that has been sent to Neighbor node. (d) Type: is the type (RREQ/RREP) of routing management frame that has been sent to Neighbor node. (e) Metric: is the metric of the routing management frame that has been sent to Neighbor node.

Upon receiving several copies of the same routing management frame, (same OrigSTA and same SeqNum) at an STA, the STA picks the best frame (based on the metric) and forwards it to its neighbor STAs, excluding the transmitter of the message. Thereafter, the STA updates its Forwarding Table entries for its neighbors.

4.4. Multi-Hop Routing with Multiple Next Hop Nodes

The example of a mmW network consists of several STA nodes is considered in which there are several intermediate STAs capable of relaying data traffic from the originating STA to the destination STA (depending on the connectivity and link configurations between STAs). In order to establish multi-hop routes, the originating STA sends a route request (RREQ) to its neighbor STAs, assuming that the STAs have previously performed a Sector Sweep (SSW). Each one-hop neighbor (in direct range) of the originating STA receives the RREQ frame and updates its routing table with an entry to the originating STA. Each neighboring STA then forwards the RREQ to its one-hop neighbors as well, excluding the originating STA from which the RREQ was received.

Figure 15:
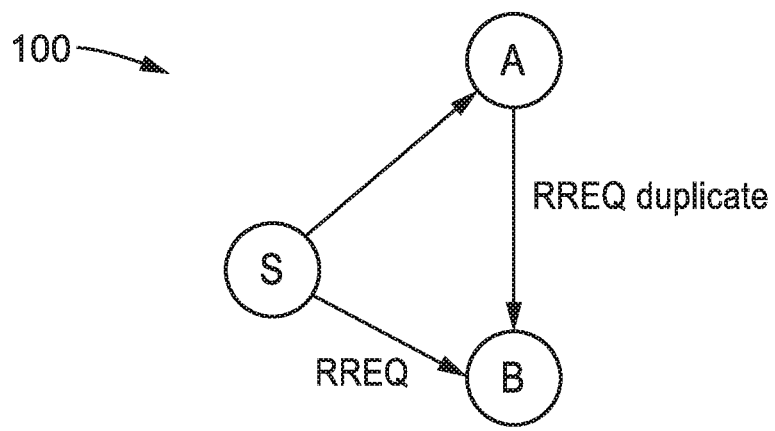
FIG. 15 is a network topology diagram of three example stations as utilized according to an embodiment of the present disclosure.

FIG. 15 illustrates an example embodiment 100 showing a network with three STAs, with STA B receiving a first Routing Request (RREQ) frame from the originating STA and another RREQ from its one-hop neighbor STA A when STA A forwards the RREQ to its neighbors (that includes B as well). Thus, it is seen that as the forwarding of RREQs continues, intermediate STAs may receive duplicate RREQs from other STAs.

In response to receiving RREQ messages, the protocol determines what the best RREQ and second best RREQ frames are in terms of the metric, to decide the next-hop and backup next-hop node to the originating STA in the routing table of the Relay STA. In the example above, STA B sets A as the backup next-hop to reach to STA (node) S, assuming that the direct link metric from STA S to STA B is more beneficial (e.g., less delay, improved SNR, etc.) metric than the sum of the link metrics STA S to STA A and STA A to STA B.

For each neighbor STA, the STA determines the best received RREQ, excluding the RREQ that has been received from the same neighbor STA, and forwards the best RREQ to its neighbor STA, and records the forwarding action in its Forwarding Table. The destination STA receives potentially several RREQ messages, and sends an Routing Reply (RREP) frame to the same STA from which a RREQ was received at the destination. Each Relay (intermediate) STA that receives an RREP message, updates its routing table to the destination STA. If the Relay STA receives more than one RREP, it selects the best RREP frame and forwards it to its one-hop neighbor STAs, and records the forwarding operation in its Forwarding Table. Similar to RREQ frames, each RREP frame and its duplicate versions determine the next-hop and backup next-hop. The process of forwarding RREP frames continues until the RREP message is received at the originating STA. According to this process, the originating STA potentially receives more than one RREP message, and it selects a hierarchy of routes, first best and second best in this example, based on the RREP messages and records them as the next-hop and backup next-hop to reach to the Destination STA.

4.5. Routing Management Frame Format

4.5.1. Routing Request (RREQ) and Routing Reply (RREP)

Figure 16:
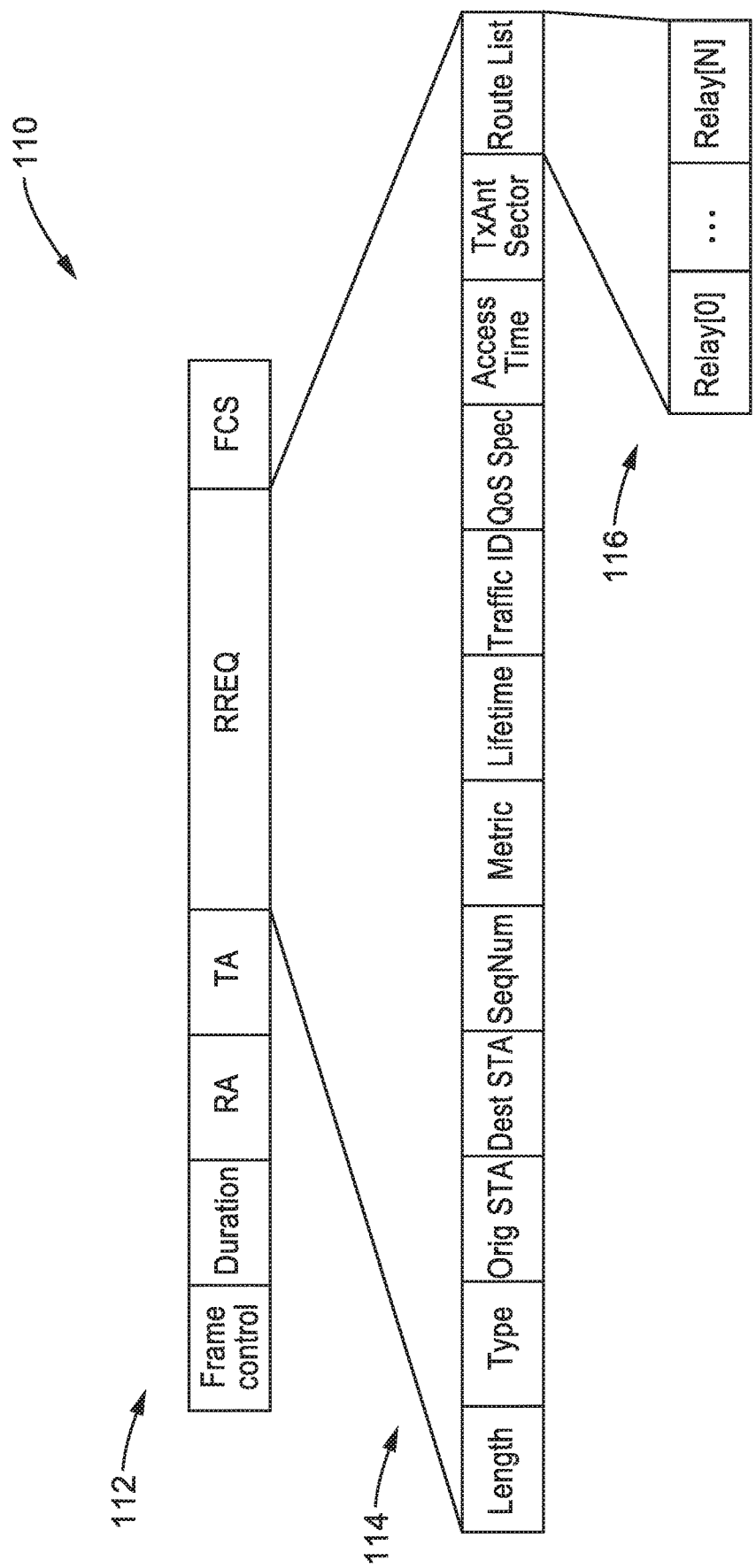
FIG. 16 is a data field diagram of a route request frame (RREQ) message according to an embodiment of the present disclosure.

FIG. 16 illustrates an example embodiment 110 of an RREQ frame 112 and its subfields 114, 116. The Frame 112 contains: (a) a Frame Control field indicating the type of frame; (b) a Duration field containing NAV information (virtual carrier-sensing mechanism) used for Carrier-Sense Multiple Access with Collision Avoidance (CSMA/CA) channel access; (c) Recipient Address (RA) field contains address of the recipient of the frame; (d) The Transmitting Address (TA) field contains the address of the STA that transmits the frame; (e) An RREQ field containing routing request particulars described below; and (f) A Frame Check Sequence (FCS) field is included in the RREQ frame.

The subfields 114 contained within the RREQ field contain: (a) Length: indicating the length of this frame; (b) Type: as the type of this frame (RREQ); (c) Orig STA: is the address of the Originating STA; (d) Dest STA: is the address of the Destination STA; (e) SeqNum: is the Sequence Number identifying this route set up, and is a value updated (e.g., incremented) every time the originating STA attempts to set up or maintain the route; (f) Metric: is a measurement which carries accumulated metric value toward the destination STA; (g) Lifetime: is the lifetime to the expiration time of this route; (h) Traffic ID: is the Traffic Identification of the associated traffic stream; (i) QoS Spec: is a traffic specification of this traffic stream (i.e., bandwidth, or similar traffic specifier); (j) Access Time: the channel time that the Transmitting Address (TA) STA uses for the transmission of data frames toward the Reception Address (RA) STA; (k) TxAntSector: is the Transmit (Tx) Antenna Sector that TA STA uses for the transmission of the data frames toward RA STA. (l) Route List: is the ID of the STAs that this frame has reached (visited) so far, in which an ID of a STA is appended to each RREQ message as seen in sub-fields 116, when it receives that frame.

Figure 17:
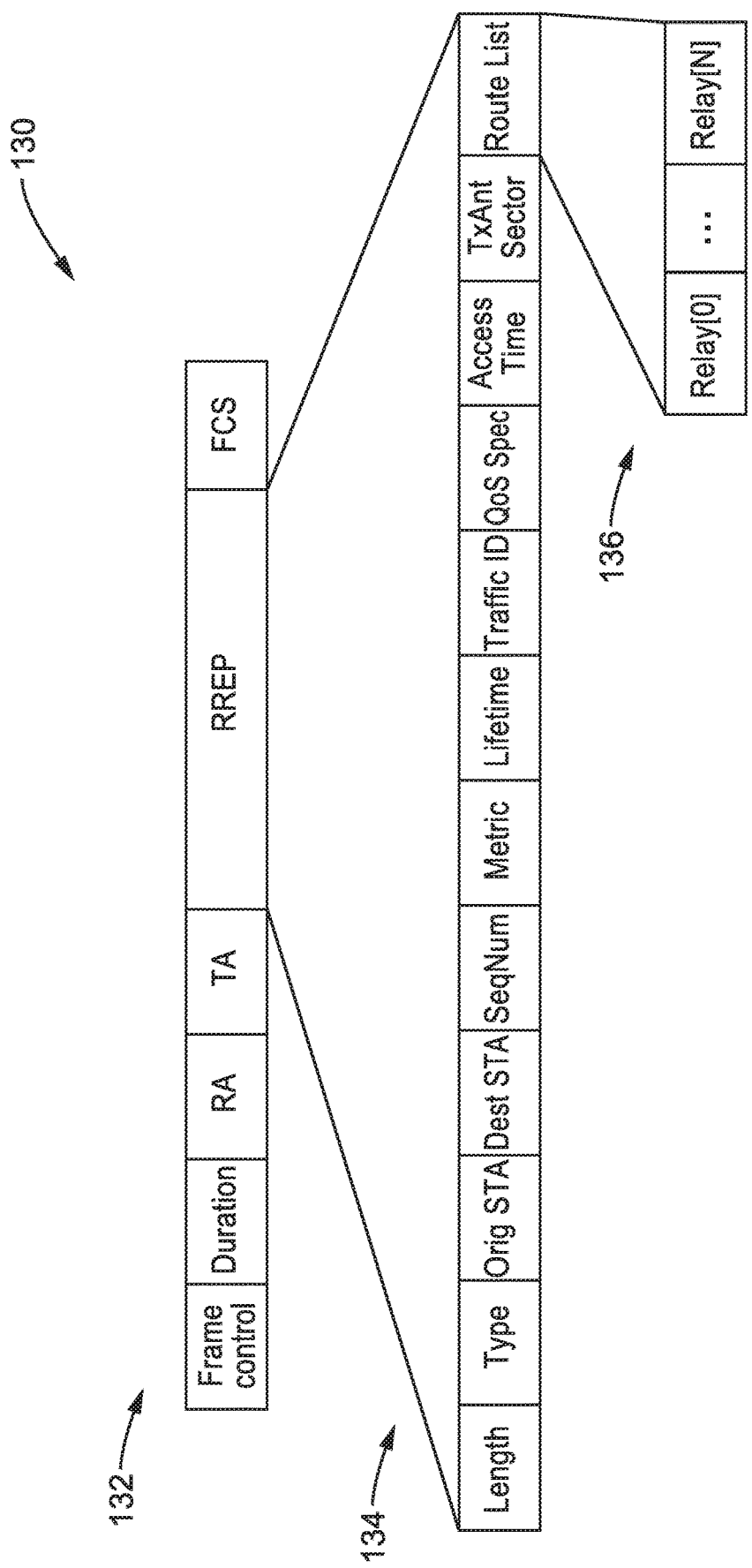
FIG. 17 is a data field diagram of a route reply frame (RREP) message according to an embodiment of the present disclosure.

FIG. 17 illustrates an example embodiment 130 of the RREP frame 132, and its sub-frame hierarchy 134 and 136. The RREP frame 132 contains the following fields: (a) a Frame Control field indicating the type of frame; (b) a Duration field containing NAV information (virtual carrier-sensing mechanism) used for Carrier-Sense Multiple Access with Collision Avoidance (CSMA/CA) channel access; (c) Recipient Address (RA) field contains address of the recipient of the frame; (d) The Transmitting Address (TA) field contains the address of the STA that transmits the frame; (e) An RREP field containing routing request particulars described below; and (f) A Frame Check Sequence (FCS) field is included in the RREQ frame.

The subfields 134 contained within the RREP field above contain the following sub-fields: (a) Length: indicating the length of this frame; (b) Type: as the type of this frame (RREP); (c) Orig STA: is the address of the Originating STA; (d) Dest STA: is the address of the Destination STA; (e) SeqNum: is the Sequence Number identifying this route reply, and the same as the RREQ being replied to; (f) Lifetime: is the lifetime to the expiration time of this route reply; (g) Traffic ID: is the Traffic Identification of the associated traffic stream; (h) QoS Spec: is a traffic specification of this traffic stream (i.e., bandwidth, or similar traffic specifier); (i) Access Time: the channel time that the Transmitting Address (TA) STA uses for the transmission of data frames toward the Reception Address (RA) STA; (j) TxAnt-Sector: is the Transmit (Tx) Antenna Sector that TA STA uses for the transmission of the data frames toward RA STA; (k) Route List: is the ID of the STAs that this RREP frame has reached (visited) so far, in which an ID of a STA is appended to each RREP message as seen in sub-fields 136, when it receives that frame.

4.5.2. Status Request (SREQ) and Status Reply (SREP)

Figure 18:
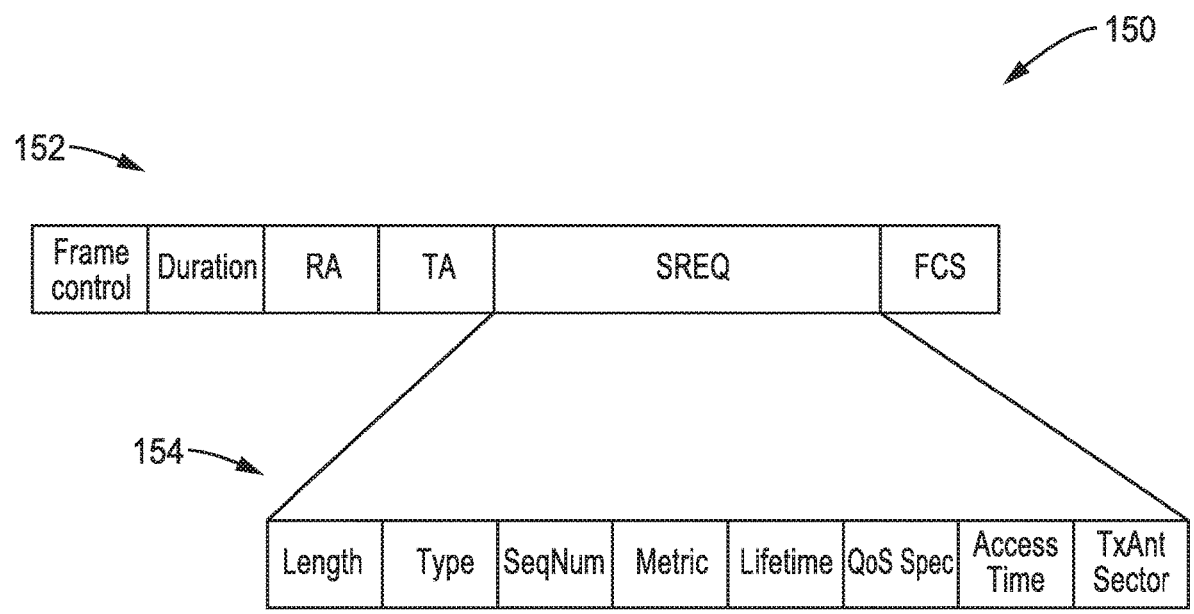
FIG. 18 is a data field diagram of a status request frame (SREQ) message according to an embodiment of the present disclosure.

FIG. 18 illustrates an example embodiment 150 of a Status Request frame 152 and its sub-fields 154. The SREQ frame 152 contains the following fields: (a) a Frame Control field indicating the type of frame; (b) a Duration field containing NAV information used for CSMA/CA channel access; (c) Recipient Address (RA) field contains address of the recipient of the frame; (d) The Transmitting Address (TA) field contains the address of the STA that transmits the frame; (e) An SREQ field containing routing request particulars described below; and (f) A Frame Check Sequence (FCS) field is included in the RREQ frame.

The SREQ field contains the following sub-fields 154: (a) Length: length of this frame; (b) Type: type of this frame (SREQ); (c) SeqNum: is the Sequence Number identifying this SREQ frame, and is updated (e.g., incremented) every time the TA sends a new status request message; (d) Metric: is a link metric from the transmitter STA to receiver STA; (e) Lifetime: is the lifetime to the expiration time of this request; (f) QoS Spec: is a traffic specification of this traffic stream (i.e., bandwidth, or similar traffic specifier); (g) Access Time: is the channel time that the TA STA (the STA identified by the TA field) uses for the transmission of data frames toward RA STA (the STA identified by the RA field); (h) TxAntSector: is the Tx Antenna Sector that the TA STA uses for the transmission of the data frames toward RA STA.

Figure 19:
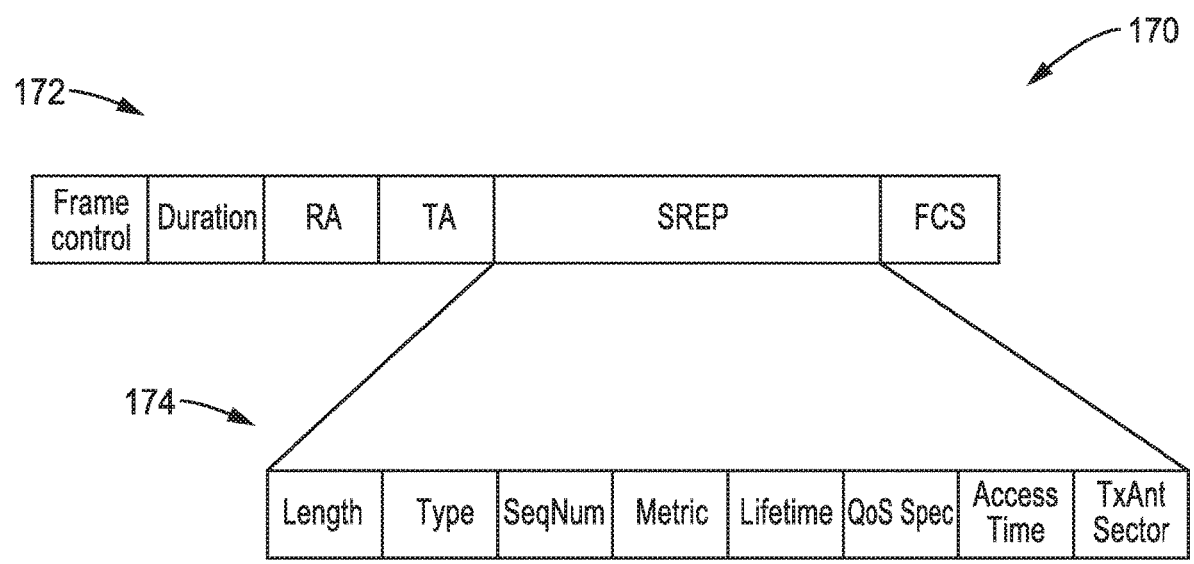
FIG. 19 is a data field diagram of a status reply frame (SREP) message by the originating station (STA) according to an embodiment of the present disclosure.

FIG. 19 illustrates an example embodiment 170 of a Status Reply frame 172 and its sub-fields 174. The SREP frame 172 contains identical fields to that of the SREQ frame except for having an SREP field, instead of an SREQ field.

5. Integrating Route Discovery and Sector Sweep

Figure 20:
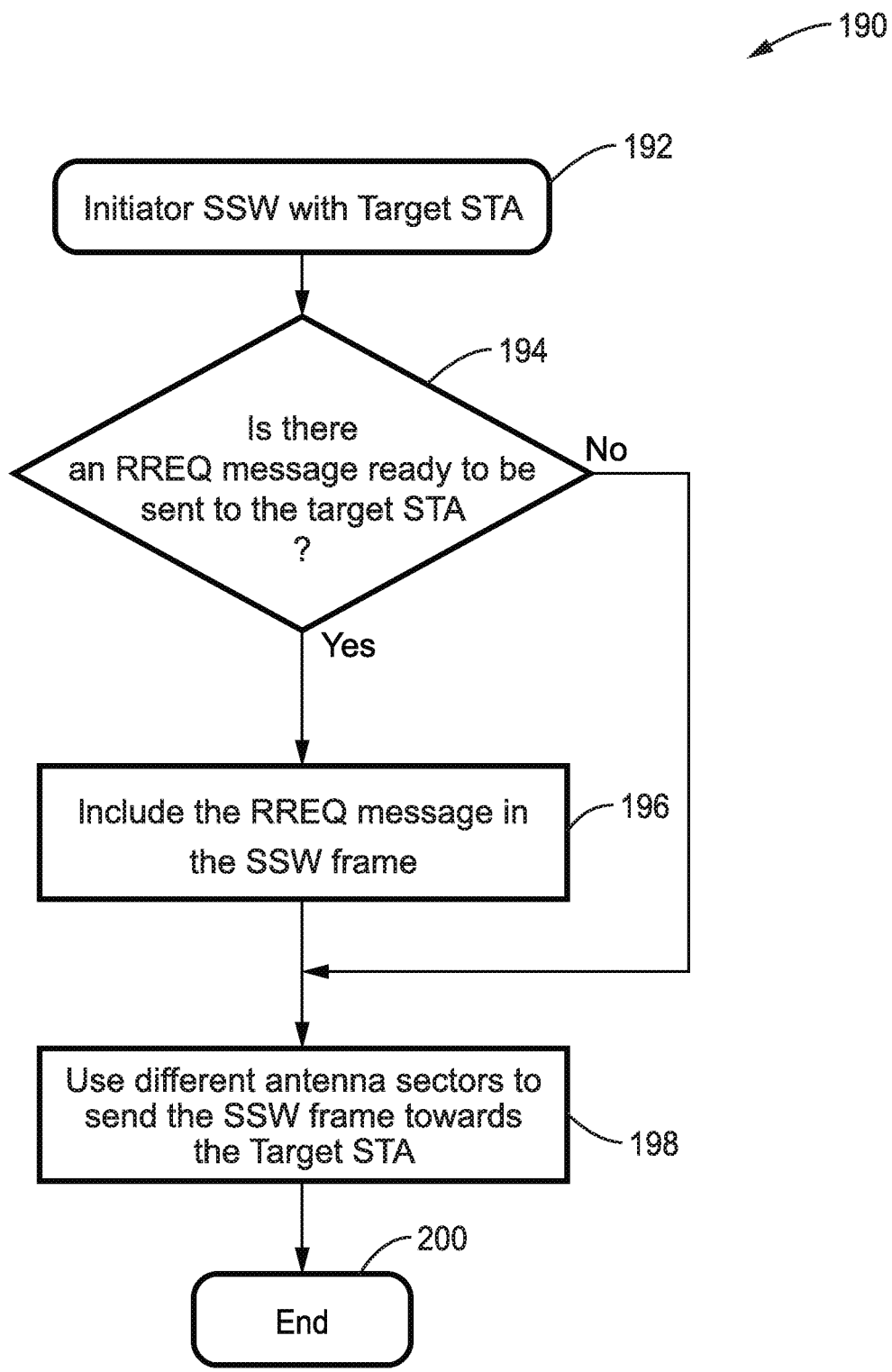
FIG. 20 is a flow diagram of initiator sector sweep processing with integrated route request transmission according to an embodiment of the present disclosure.

FIG. 20 illustrates an example embodiment 190 of a process performed under the disclosed wireless protocol for integrating route discovery and sector sweep operations. Execution commences at block 192 with an initiator STA starting Sector Sweep (SSW) operations with a neighbor STA. A check is made at block 194, if there is a need to send a route request (RREQ) message to the target STA. If there is an RREQ to be sent, then at block 196 the STA appends the RREQ frame to each sector sweep operation and piggybacks its request on top of the SSW. Then block 198 is reached directly from block 194, or through block 196, and the SSW frame is sent 198 towards a target STA that is neighbor of the Transmitter STA, with the process performed using different antenna sectors in sending the SSW frame toward the target STA, before processing ends 200.

Figure 21:
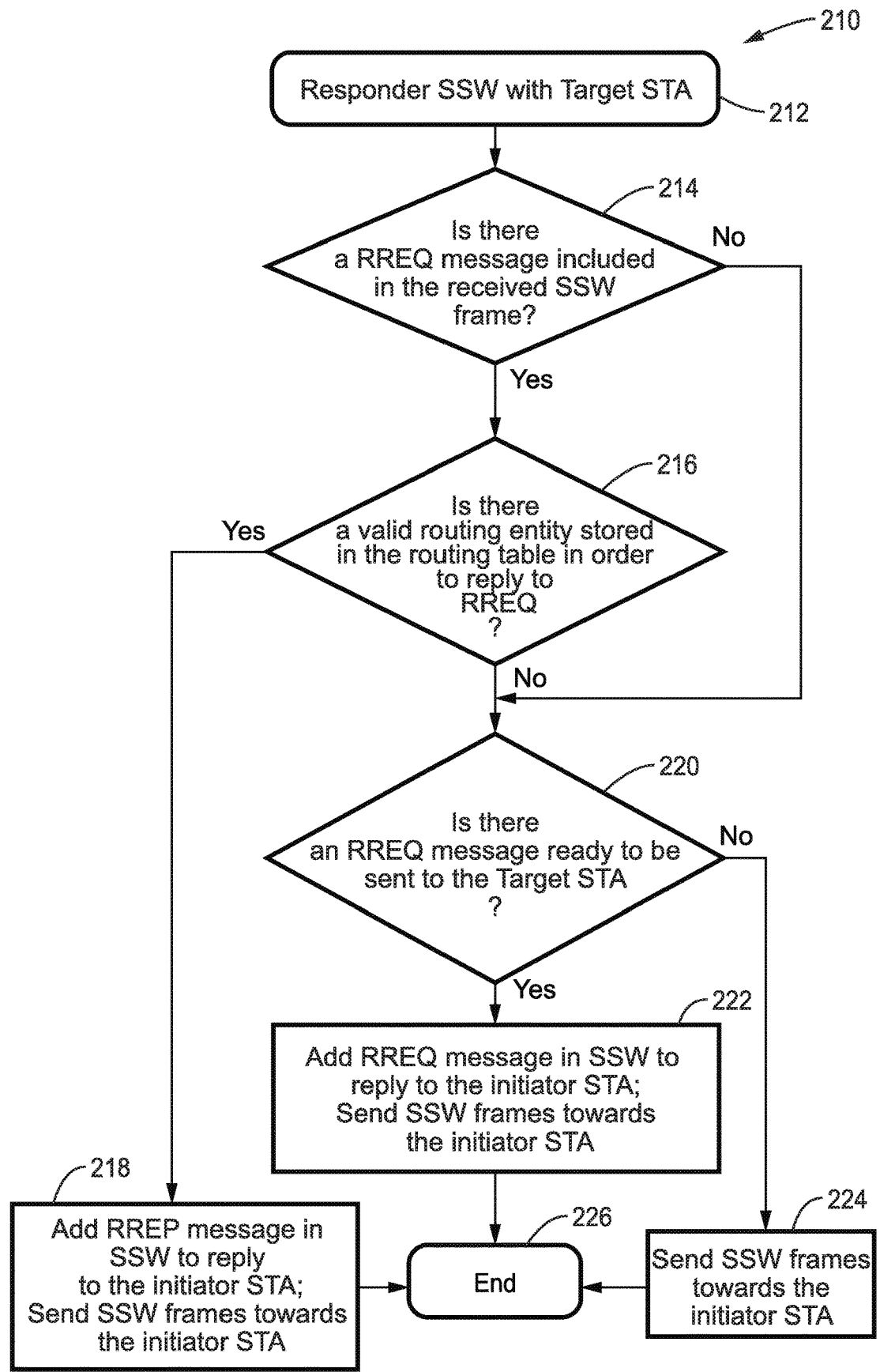
FIG. 21 is a flow diagram of responder sector sweep processing an integrated route request according to an embodiment of the present disclosure.

FIG. 21 illustrates an example embodiment 210 of responder integrated sector sweeping logic. The process commences 212 when a Neighbor STA receives an SSW frame that it needs to reply to. A check is made 214 if the SSW frame contains any RREQ messages. If there is an attached RREQ, then the Responder checks 216 if it has a valid routing entity in its routing table in order to reply to the RREQ back to the initiator. If there is a valid entity, then block 218 is reached with an RREP message generated and added to the SSW to reply to the initiator STA, and the SSW frames are sent before the process ends 218.

If there was no appended RREQ detected in block 214, then check 216 is skipped and execution reaches block 220, checking if this STA has an RREQ message to be sent to the target STA. If there is no RREQ at the responder, then the Responder replies 224 back to the initiator with traditional SSW frames (no routing information appended), before ending 226 this process.

If there is an RREQ to be sent back to the Initiator as detected at check block 220, then at block 222 the Responder appends that RREQ to the SSW frame and sends this within its reply back to the Initiator STA before ending 226 the process. When a STA receives an RREQ, it processes the routing request to setup a communication route with its neighbor STA.

If after completing this SSW operation between the two STAs, there is another RREQ/RREP message received, then there are two cases for handling the situation. (a) If the received metric is better (e.g., shorter path cost), then the STA forwards the RREQ/RREP through the established directional link if the sector sweep information is valid and up-to-date. (b) If the metric of the newly received RREQ and RREP frame is not better (e.g., does not have a shorter path length), then the newly received RREQ and RREP is simply dropped (discarded). The logic for the above can be implemented in a number of ways.

Accordingly, the general workflow is as follows: (1) if an SSW was not performed between the two nodes, and there is a need to send an RREQ or RREP, then these messages are piggybacked (appended) to these SSW messages; or (2) if the SSW has been performed between the two nodes, then the STAs send RREQ/RREP through established directional links to that node only.

5.1. Example 1: Intermediate STAs with Up-To-Date Route Info

Consider the case in which intermediate STAs have up-to-date (presumed valid) route information for the destination STA.

Figure 22:
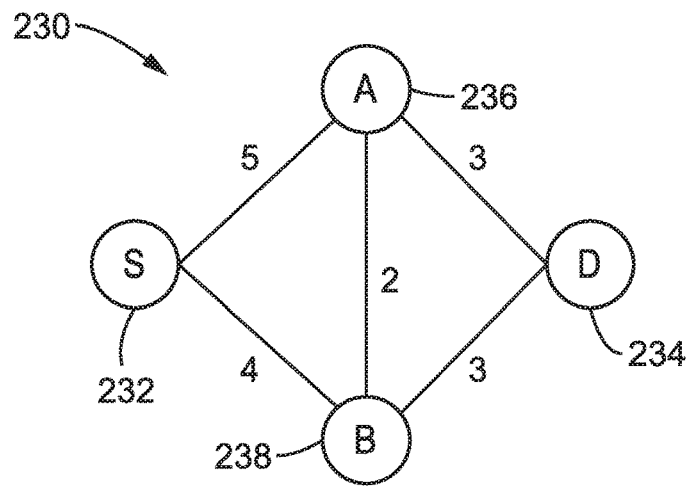
FIG. 22 is a network topology diagram utilized by way of example according to an embodiment of the present disclosure.

FIG. 22 illustrates an example embodiment 230 of a network topology having four stations, including a source STA S 232, a destination STA D 234, and intermediate STA A 236 and STA B 238. Metric values (e.g., 5, 3, 3, 4, 2) are depicted alongside their respective link lines in the figure, indicating a cost/delay metric for each respective link. In this example STA S 232 has just joined the network and it has data traffic to send to STA D 234. The Routing Table for STA S when it joins the network is empty as shown in Table 1.

Before moving on, it should be appreciated that rolls of each station as source, destination or intermediary as described for this and other figures are solely dependent on the path for which data communication is desired, and can change during subsequent network operations; thus the disclosed protocol executing at each station can fulfill any of the rolls as necessary.

In the example, STA S will need to discover routes towards STA D, and according to the protocol STA S 232 sends an RREQ to its neighbor STAs, which are STA A 236 and STA B 238. STA A 236 and STA B 238 have already established their routes toward destination STA D 234. Since it is assumed that STA A has already performed a route discovery operation, its Routing Table is shown in Table 2. The Routing Table for STA B is shown in Table 3 in which STA B has set up its route toward STA D.

The process begins with STA S starting an SSW with STA A and STA B. Since STA S desires to discover a route towards STA D, there is a Route Request (RREQ) generated by STA S. STA S appends this RREQ to the SSW frames. And since it has been assumed that STA A and STA B already have routing information to reach destination D, they append route reply (RREP) messages to the SSW response frames. STA A and STA B reply back to STA S about their routing information along with their SSW reply frames.

Figure 23:
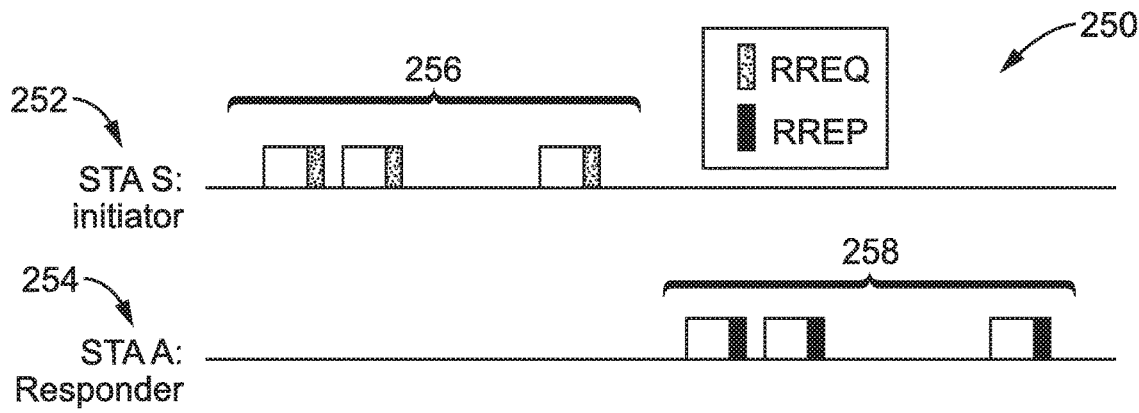
FIG. 23 is a signaling diagram showing initiator and responder communications using integrated sector sweeping and route discovery between station S and station A according to an embodiment of the present disclosure.
Figure 24:
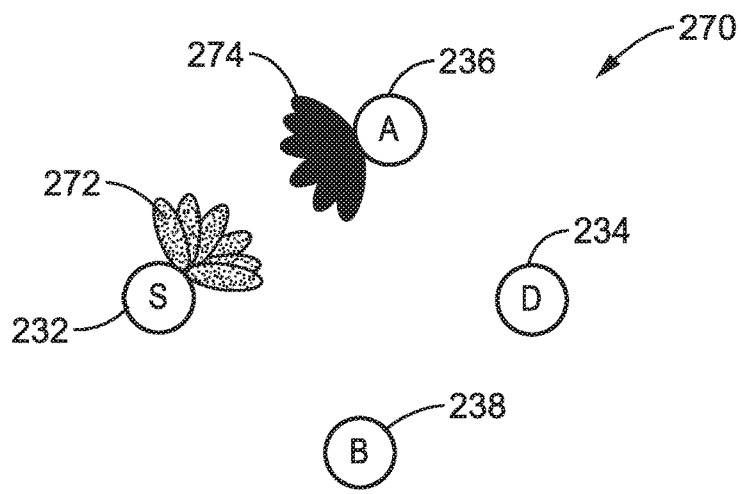
FIG. 24 is a network topology diagram showing sector sweeps performed between station S and station A as per FIG. 23 according to an embodiment of the present disclosure.
Figure 25:
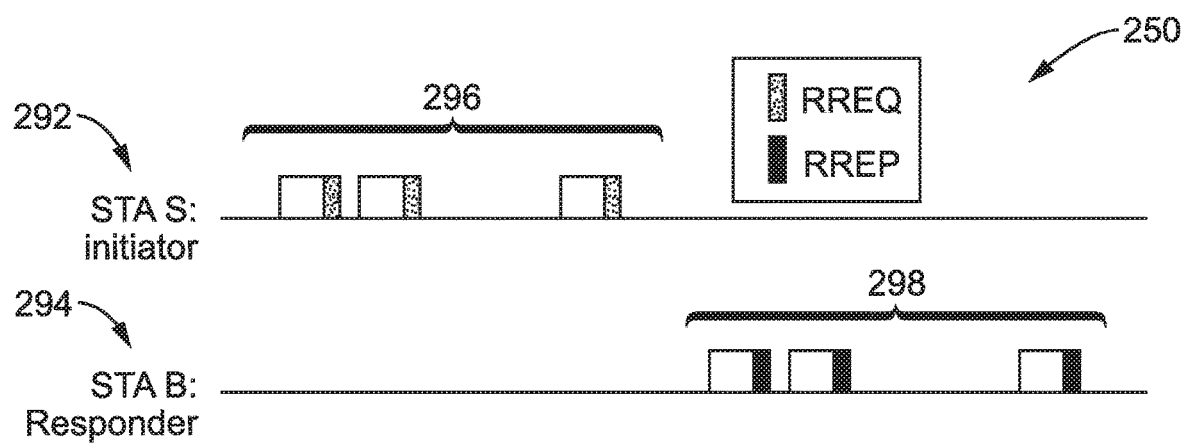
FIG. 25 is a signaling diagram showing initiator and responder communications using integrated sector sweeping and route discovery between station S and station B according to an embodiment of the present disclosure.
Figure 26:
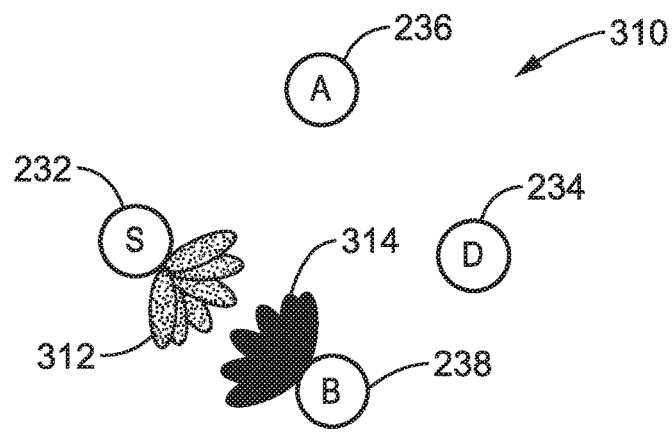
FIG. 26 is a network topology diagram showing sector sweeps performed between station S and station B as per FIG. 25 according to an embodiment of the present disclosure.

FIG. 23 through FIG. 26 illustrate an example embodiment 250, 270, 290, 310 of the above process. In FIG. 23 STA S is the initiator 252 and STA A is the responder 254, with RREQs 256 being sent from STA S to STA A, and RREPs 258 being sent back from STA A to STA S. In FIG. 24 an SSW, involving respective sector directions 272, 274, are shown performed between STA S 232 and STA A 236. Similarly, in FIG. 25 STA S is the initiator 292 and STA B is the responder 294, with RREQs 296 being sent from STA S to STA B, and RREPs 298 being sent back from STA B to STA S. In FIG. 26 an SSW, involving respective sector directions 312, 314, are shown performed between STA S 232 and STA B 238.

In the above combination of exchanges STA S is seen receiving two RREP messages, one from STA A and one from STA B. The metric included in these RREP messages are the path metric of STA A and STA B to reach destination STA D. Upon receiving the RREP along with SSW frames, STA A compares the metrics and fills out its routing table (updates it routing table), in this case such that there is primary next-hop and backup next-hop option to reach Destination D. In addition, STA S fills its routing table entries corresponding to STA A and STA B with the associated metric of their one-hop links. The updated routing table of STA S is shown in Table 4.

After STA S performs the SSW with STA A and STA B, these nodes also receive information about the link metric between themselves with STA S. Therefore, STA A and STA B also update their routing tables as seen in Table 5 and Table 6.

5.2. Example 2: Intermediate STAs w/o Destination Routing Info

In this example the same topology and link metrics are considered as in Example 1, which was shown in FIG. 22. In this example it is assumed that there is no routing information available beforehand at STA A and STA B, whose routing tables are seen in Table 7 and Table 8.

In this case, upon STA S receiving data traffic to send to destination STA (i.e., STA D), according to its routing table, as seen in Table 9, it is found there is no valid route information available. Therefore, when STA S starts an SSW with STA A and STA B, it embeds the RREQ in the SSW frames. However, since STA A and STA B do not have routing information; they reply to the SSW operation without any route reply (RREP) information.

Figure 27:
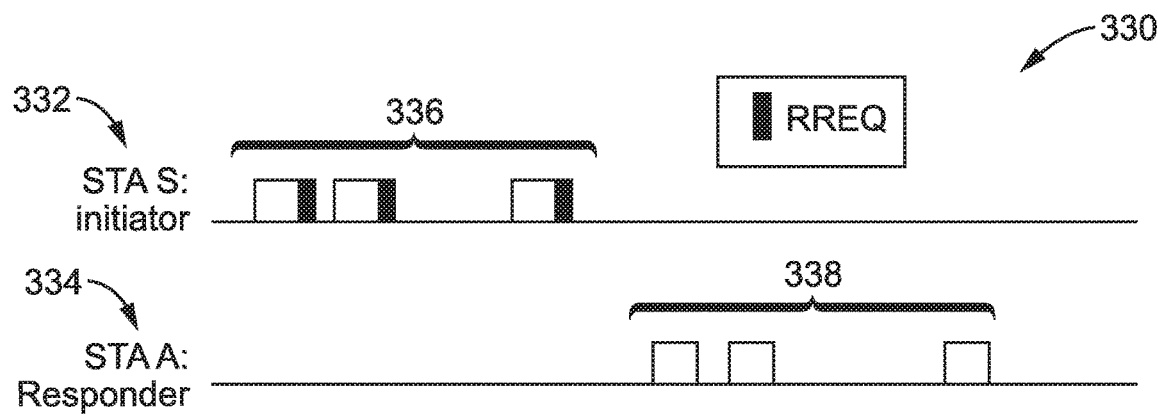
FIG. 27 is a signaling diagram showing initiator and responder communications using integrated sector sweeping and route discovery between station S and station A which lacks request reply information according to an embodiment of the present disclosure.
Figure 28:
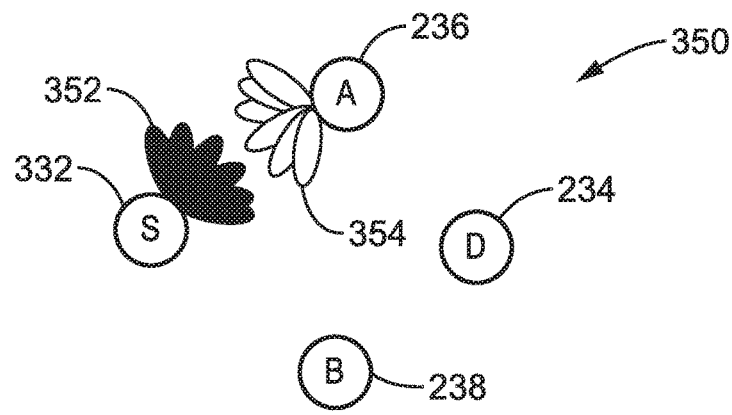
FIG. 28 is a network topology diagram showing sector sweeps performed station S and station A as per FIG. 27 according to an embodiment of the present disclosure.

FIG. 27 and FIG. 28 illustrate example embodiments 330, 350 of the exchanges between STA S and STA A. In FIG. 27 STA S is the initiator 332 which sends RREQs 336 to a responder that is STA A 334. STA A replies back 338 to the initiator without any RREP information (as denoted by the empty data boxes). In FIG. 28 the SSW exchanges 352, 354 are seen occurring between STA S 232 and STA A 236, during which the RREQ and empty replies are exchanged. In response to this exchange STA S receives SSW from STA A and it updates its routing table as shown in Table 10. STA A receives the RREQ from STA S and estimates the link metric, updating its routing table as seen in Table 11.

Figure 29:
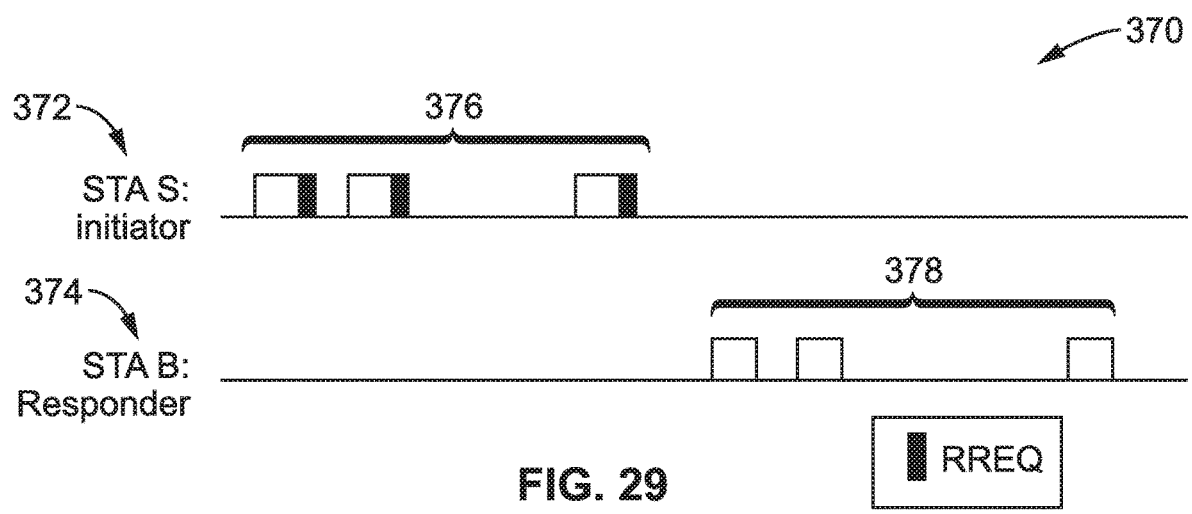
FIG. 29 is a signaling diagram showing initiator and responder communications using integrated sector sweeping and route discovery between station S and station B which lacks request reply information according to an embodiment of the present disclosure.
Figure 29:
Figure 30:
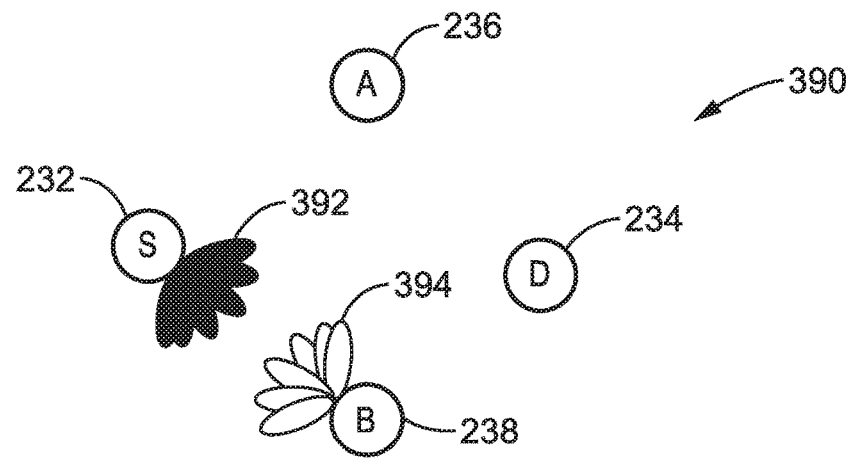
FIG. 30 is a network topology diagram showing sector sweeps performed station S and station B as per FIG. 29 according to an embodiment of the present disclosure.

FIG. 29 and FIG. 30 illustrate an example embodiment 370, 390 of exchanges between STA S and STA B. In FIG. 29 initiator STA S 372 appends RREQs 376 to SSW frames, but responder STA A 374 does not have RREP information to append to the SSW frames in its response 378 to STA S, as noted by the empty data boxes being returned. In FIG. 30 SSWs 392, 394 are seen between STA S and STA B. Thus, it is seen in these figures that STA B receives RREQ from STA S across different sectors, and replies without including RREP information.

As a result of the above SSW exchanges, STA S updates its routing table to populate the entities corresponds to Destination STA B, with the updated table shown in Table 12, and STA B updates its routing table as shown in Table 13.

Now according to the protocol STA A and STA B, having received RREQs from STA S, must forward RREQs and perform SSWs with their neighbor stations. By way of example, and not limitation, the discussion begins processing with STA A, although it could have also started with STA B. Depending on the order of SSW of STA A with its neighbor STAs, there are two cases. Case 1: in which STA A first performs SSW with STA B, after which it performs SSW with STA D. Case 2: in which STA A first performs SSW with STA D and then it performs SSW with STA B.

5.2.1. Case 1

Figure 31:
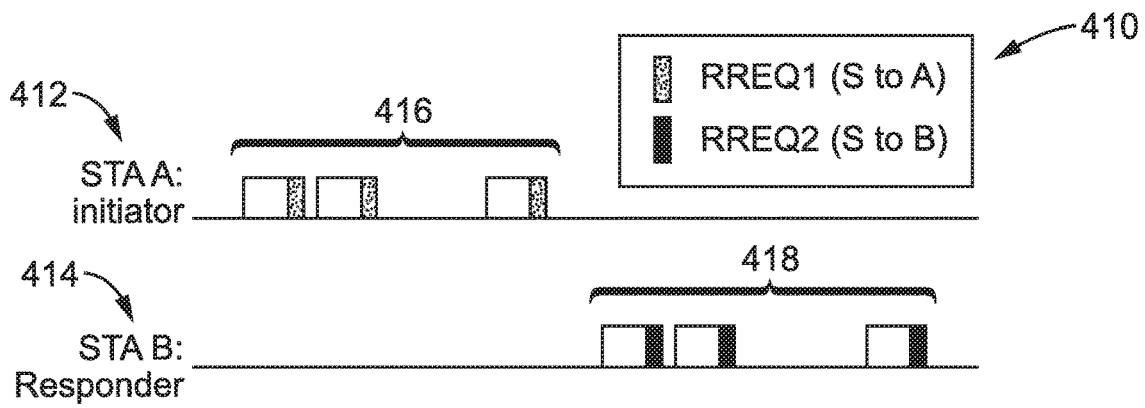
FIG. 31 is a signaling diagram showing initiator and responder communications using integrated sector sweeping and route discovery between station A and station B according to an embodiment of the present disclosure.
Figure 32:
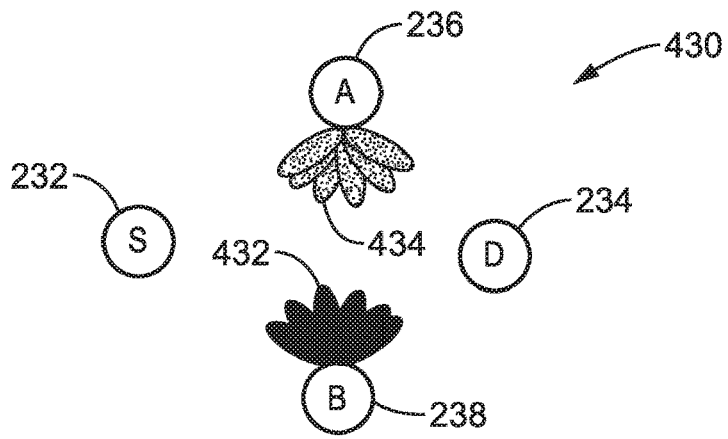
FIG. 32 is a network topology diagram showing sector sweeps performed between station A and station B as per FIG. 31 according to an embodiment of the present disclosure.

FIG. 31 and FIG. 32 illustrate an example embodiment 410, 430 of appending RREQ by STA S and STA B. In FIG. 31 STA A as initiator 412 is sending RREQ1 416, which was received from STA S, to STA B as responder 414. Similarly, STA B is then seen appending RREQ2 418, which was received from STA A, to STA A. Therefore, when STA A and STA B perform SSW with each other, they embed these RREQs within their transmitted SSW frames.

As a result of the SSW operation with STA B, STA A has received two RREQ frames with two metrics. A first RREQ, referred to here as RREQ1, has been received directly from STA S. Another RREQ is received through STA B, and is referred to here as RREQ2. Similarly, STA B has received two RREQs, one from STA S and one from STA A. Therefore, STA A and STA B can populate the Backup NextHop entity in their routing table, with the updates for these STA seen in Table 14 and Table 15.

Figure 33:
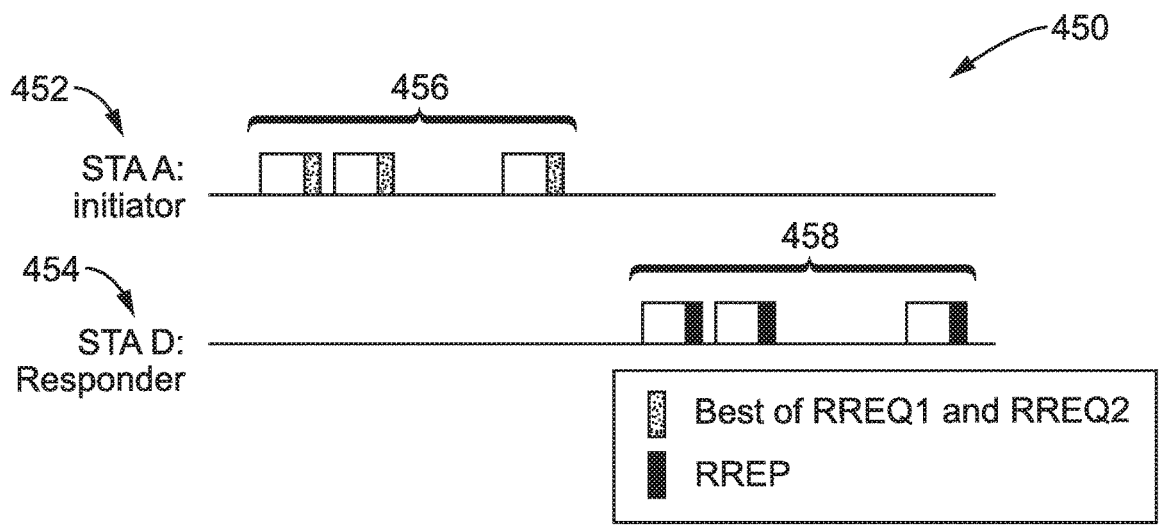
FIG. 33 is a signaling diagram showing initiator and responder communications using integrated sector sweeping and route discovery between station A and station D according to an embodiment of the present disclosure, in which station A selects the best of its received route requests to pass along.
Figure 34:
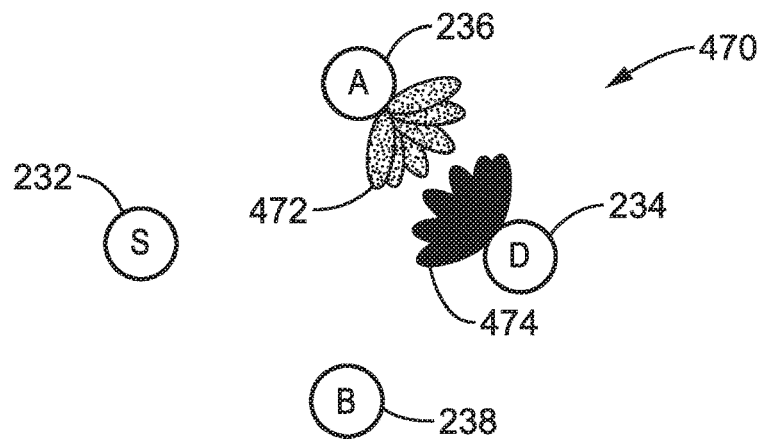
FIG. 34 is a network topology diagram showing sector sweeps performed between station A and station D as per FIG. 33 according to an embodiment of the present disclosure.

FIG. 33 and FIG. 34 illustrate an example embodiment 450, 470 of appending RREQ by STA A to STA D during an SSW, after first performing an SSW with STA B. In FIG. 33 STA A as initiator 452 sends the RREQ 456 having the RREQ containing the best metric, here being either RREQ1 or RREQ2, to STA D as responder 454. It will be noted that STA A has received two RREQs, from which it picks the one with the best path metric and performs SSW with STA D, while the best RREQ is appended to the SSW frames. It should be appreciated that the logic of selecting and forwarding the RREQ with the best metric can be performed with conventional RREQ, RREP approaches or variants thereof without departing from the teachings of the present disclosure. Since the RREQ frame is being communicated to destination STA D, STA D as responder 454 appends RREP information 458 to the response SSW frames.

FIG. 34 depicts STA A 236 initiating SSW 472 with STA D 234, followed by an SSW 474 from STA D 234 as was described above. After STA A has received the RREP from STA D it is configured to update its routing table as shown in Table 16. Moreover, STA D has received RREQ from STA A through SSW frames, and it updates its routing table as shown in Table 17.

5.2.2. Case 2

Figure 35:
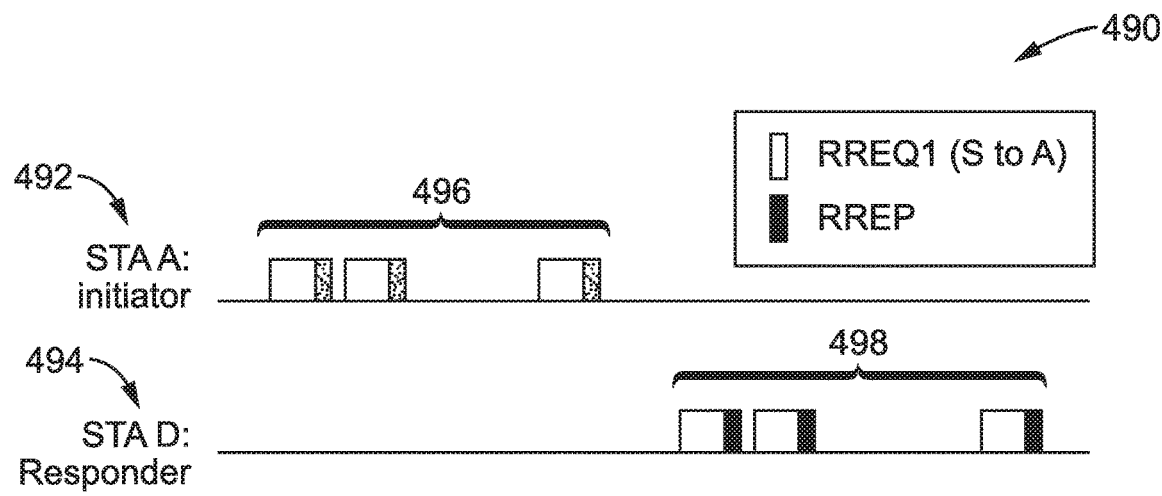
FIG. 35 is a signaling diagram showing initiator and responder communications using integrated sector sweeping and route discovery between station A and station D according to an embodiment of the present disclosure.
Figure 36:
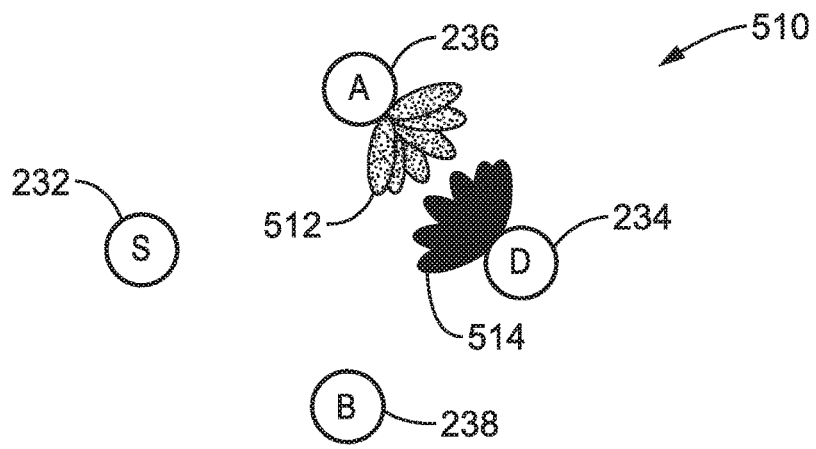
FIG. 36 is a network topology diagram showing sector sweeps performed between station A and station D as per FIG. 35 according to an embodiment of the present disclosure.

FIG. 35 and FIG. 36 illustrate an example embodiment 490, 510 of appending RREQ by STA A to STA D during an SSW, before performing an SSW with STA B. In Case 2 the SSW is configured with a different order that described above, in particular STA A performs the SSW with STA D first, after which it performs the SSW with STA B. If STA A performs SSW with STA D first, then STA A appends the RREQ message received from STA S to the SSW frames toward STA D. In return, STA D replies with RREP information.

In FIG. 35 STA A as initiator 492 sends RREQ1 496, which was received from STA S, to STA D as responder 494. In response STA D as responder 494 sends RREP 498 to STA A as initiator 492.

In FIG. 36 STA A 236 is seen performing SSW 512 with STA D 234 which also performs SSW 514 with STA A 236.

As a result of the above SSW operation, STA A and STA D are able to update their routing tables as shown in Table 18 and Table 19. It should be noted that these results are consistent with Case 1 since the best of RREQ1 and RREQ2 is the same as RREQ1 (due to specific link metrics in this particular example).

Figure 37:
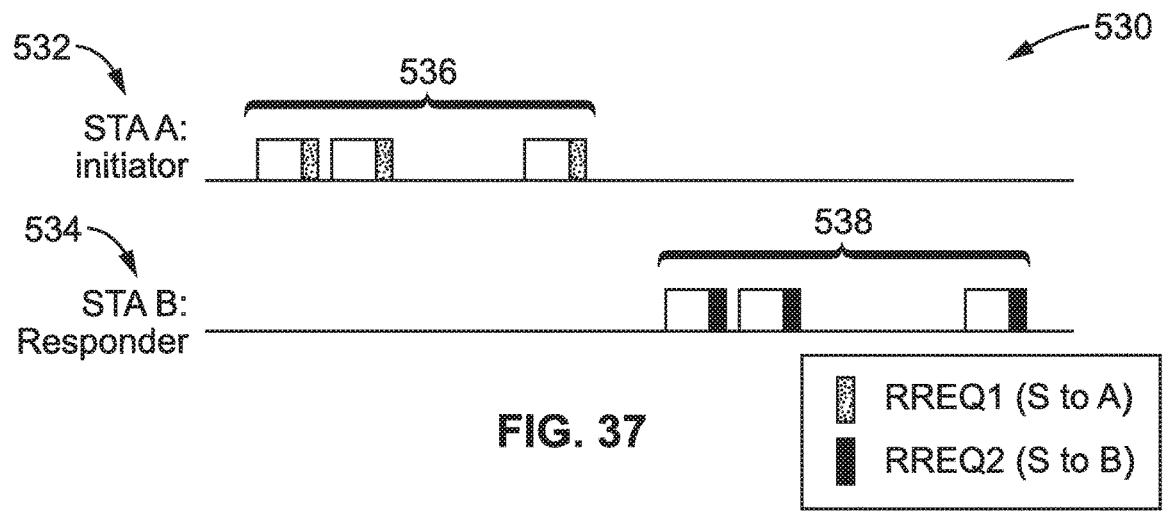
FIG. 37 is a signaling diagram showing initiator and responder communications using integrated sector sweeping and route discovery between station A and station B according to an embodiment of the present disclosure.
Figure 38:
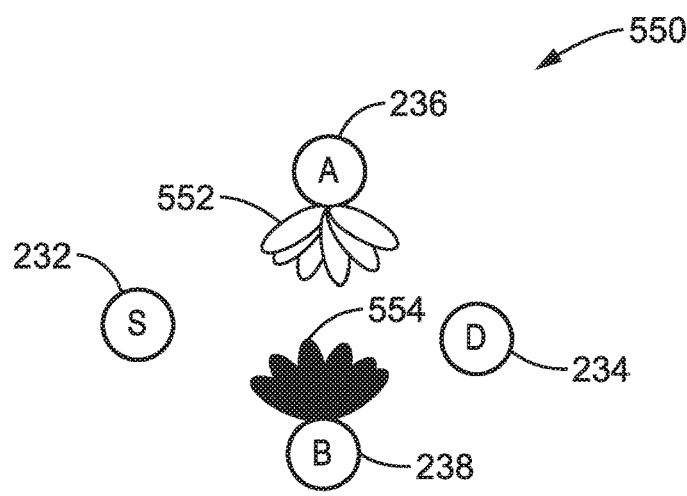
FIG. 38 is a network topology diagram showing sector sweeps performed between station A and station B as per FIG. 37 according to an embodiment of the present disclosure.

FIG. 37 and FIG. 38 illustrate an example embodiment 530, 550 of appending RREQ by STA A to STA B during an SSW, after performing an SSW with STA D. After STA A performs its SSW with STA D it commences to perform an SSW with STA B.

In FIG. 37 STA A as initiator 532 forwards RREQ1 536, as received from STA S, towards STA B as responder 534. STA B responds by forwarding RREQ2 538, as received from STA S, to STA A.

In FIG. 38 STA A 236 is seen performing SSW 552 with STA B 238, after which STA B 238 performs an SSW 554 with STA A 236.

As a result of the above operations, STA A and STA B are able to update their routing table as shown in Table 20 and Table 21.

Figure 39:
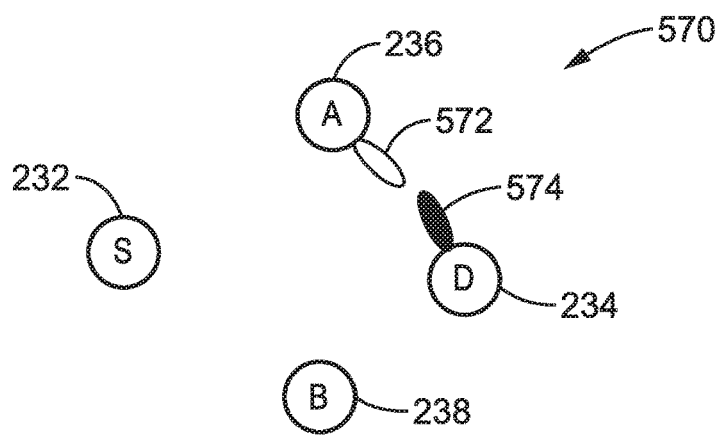
FIG. 39 is a network topology diagram showing an established directional link between station A and station D according to an embodiment of the present disclosure with a route request sent through the established link.

FIG. 39 illustrates an example embodiment 570 of the protocol handling a case in which a directional link has been established and there is another RREQ frame that needs to be sent to the neighbor STA, which in this example the RREQ is forwarded through the established directional link. In this case, STA A 236 receives another RREQ from STA B (RREQ2), and compares its metric with RREQ1 that it has already been forwarded to STA D. If the metric of RREQ2 is worse than the metric of RREQ1, then STA A ignores the RREQ2 received from STA B. However, if the metric of the second RREQ (RREQ2 received from STA B) is better, then RREQ2 message is forwarded to STA D through directional link 572, 574 established by between STA A 236 and STA D 234.

5.2.3. Node (STA) B

Figure 40:
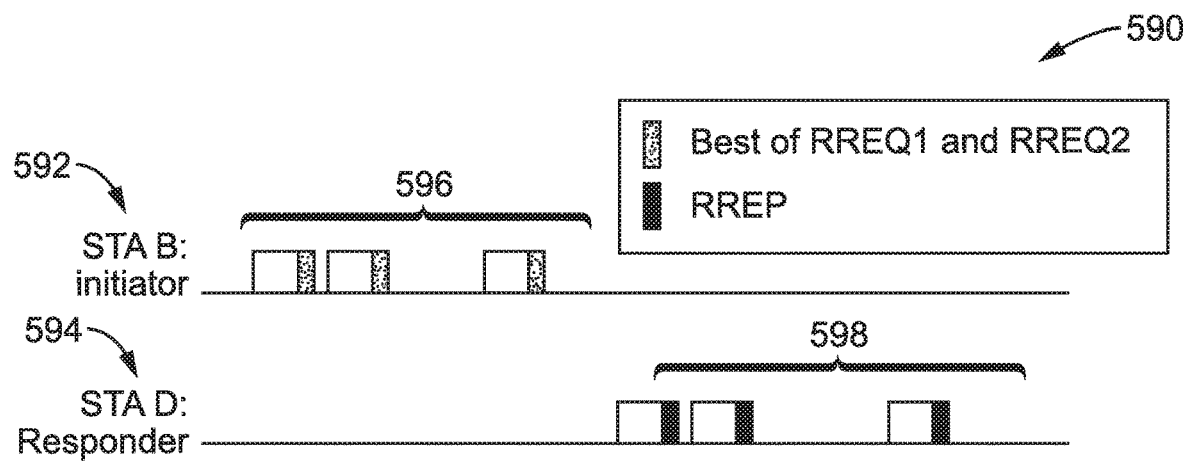
FIG. 40 is a signaling diagram showing initiator and responder communications using integrated sector sweeping and route discovery between station B and station D according to an embodiment of the present disclosure after STA B has received two routing requests.
Figure 41:
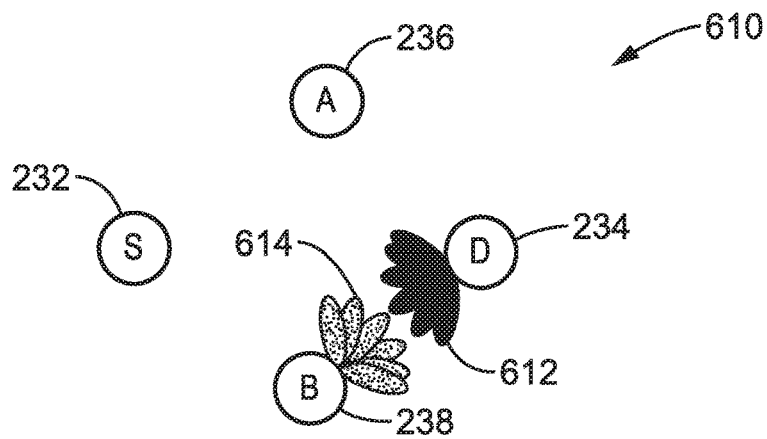
FIG. 41 is a network topology diagram showing sector sweeps between sectors from station A and station B as per FIG. 40 according to an embodiment of the present disclosure.

FIG. 40 and FIG. 41 illustrates an example embodiment 590, 610 of the case with STA B as initiator and STA D as responder. The case was described above for STA A performing SSW with STA D, and the following now considers STA B operation, after STA B has received both RREQ1 and RREQ2. RREQ1 was received from STA S directly, and RREQ2 was received through STA A. In FIG. 40 STA B as initiator 592 selects the RREQ message with the best metric and forwards it 596 to STA D as responder 594 through a SSW operation. In response to this RREQ message STA D replies with an RREP 598 back to STA B. In FIG. 41 STA B 238 performs SSW 612 with STA D 234, then STA D 234 performs SSW 614 with STA B 238. As a result of this SSW, STA B and STA D update their routing tables as shown in Table 22 and Table 23.

Figure 42:
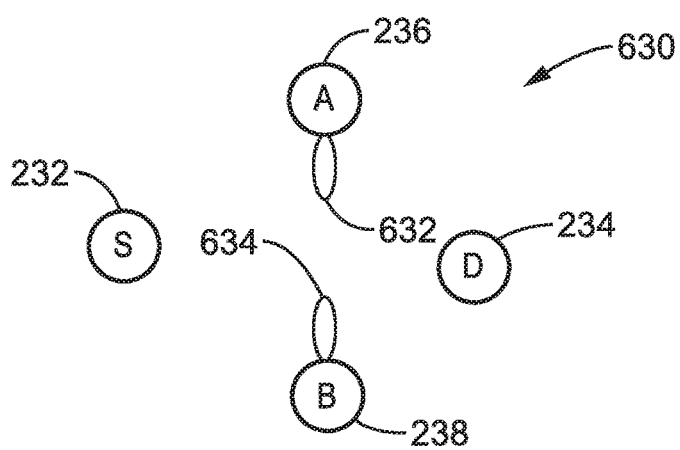
FIG. 42 is a network topology diagram showing an established directional link between station A and station B over which route reply messages are exchanged according to an embodiment of the present disclosure.

FIG. 42 illustrates an example embodiment 630 in which STA A 236 and STA B 238 exchange received RREP messages. Since STA A and STA B have already completed their SSW operation, they are shown sending RREP messages through the beamformed link 632, 634. After this step, all the STAs in this example have performed the SSW. Then the remainder of RREQ/RREP messages can be exchanged over directional links (beamformed) that are established as a result of the SSW operations.

Therefore, STA A and STA B update their routing tables with backup options to reach to STA D, with the updated tables shown in Table 24 and Table 25.

Figure 43:
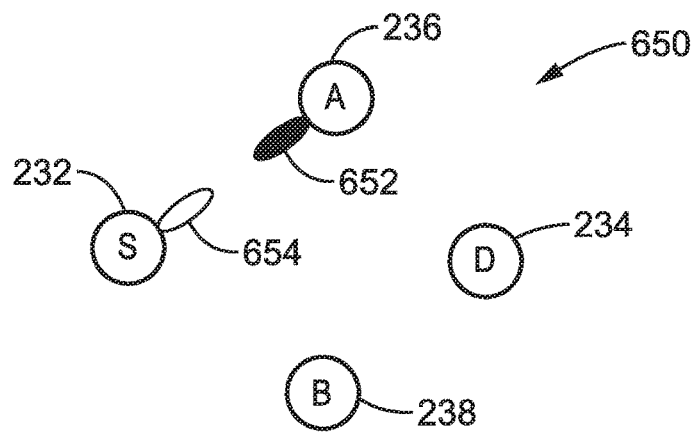
FIG. 43 is a network topology diagram showing an established directional link between station A and station S over which a route reply message is passed according to an embodiment of the present disclosure.

FIG. 43 illustrates an example embodiment 650 in which STA A 236 sends an RREP to STA A 232 over the beamformed link 652, 654 which has been established between these two stations. In this step, STA A has received two RREP frames, one frame is received from each of STA D, and STA B. STA A sends the RREP message with the best metric towards STA S. In this exchange, STA A and STA S communicate over a beamformed link which has been established in the first step, i.e., when STA S and STA A were performing SSW for the sake of RREQ messages. The figure demonstrates this directional exchange between STA A and STA S. As a result of the exchange, the updated routing table at STA S is shown in Table 26.

Figure 44:
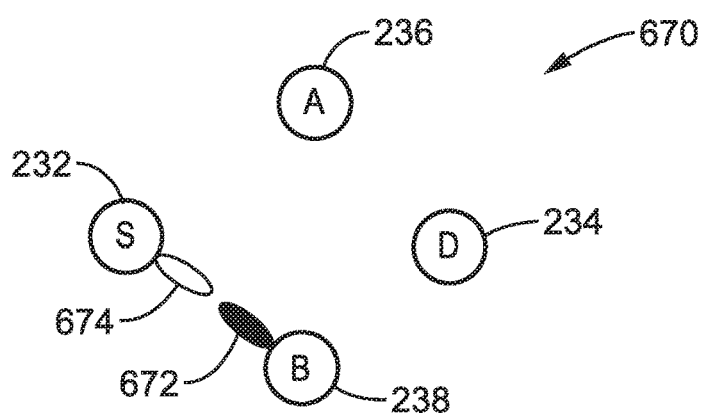
FIG. 44 is a network topology diagram showing an established directional link between station B and station S over which a route reply message is passed according to an embodiment of the present disclosure.

FIG. 44 illustrates an example embodiment 670 of STA B sending an RREP to STA S over the beamformed link 672, 674 established after the SSW process. In similar manner to STA A described above, STA B 238 forwards the best of RREP messages received from STA D 234 and STA A 236 towards STA S 232. STA B and STA S have already performed the SSW, and thus STA B sends the RREP through the beamformed (BF'd) link, as seen in the figure. As a result the updated routing table at STA S is shown in Table 27.

It should be appreciated that the order of SSW performed across neighboring STAs does not affect the outcome of the links and operation as the proposed method for storing and forwarding the RREQ and RREP with best metric is independent of the order of operation.

5.3. Integrating Beam Refinement Protocol and Route Discovery

In the previous section, it was detailed how the RREQ frames can piggyback on top of sector sweep frames. In this case, the RREQ frame is transmitted over transmit sectors and the neighbor STA receives the RREQ frame through various sectors. Therefore, through this process, the STA and its neighbor STAs perform the sector sweep while they also exchange the RREQ and/or RREP frames. The goal of the sector sweep operation is to determine the antenna settings that enable two devices to establish a directional link. Once the devices establish their link, the STAs are capable of performing beam refinement. Therefore, the STAs may optimize their antenna settings through the use of a Beam Refinement Protocol (BRP).

In the present system the BRP training is performed using training and response fields which can be appended to route request and reply messages. In the present disclosure the TRN and BRP functionalities are added to the route discovery frames (RREQ and RREP). TRN fields are added to these frames, and thus as each routing frame is communicated, the STA and neighbor STA also refine their beamforming training.

Once two STAs intend to refine their beams, they initiate the BRP operation. In this case, one STA is called the beam tracking initiator, and the other STA is called the beam tracking responder. If there are any routing control messages (e.g., RREQ) at the beam tracking initiator, then the TRN field is appended to the RREQ message. The beam tracking responder then receives the RREQ frame with TRN field appended.

Figure 45:
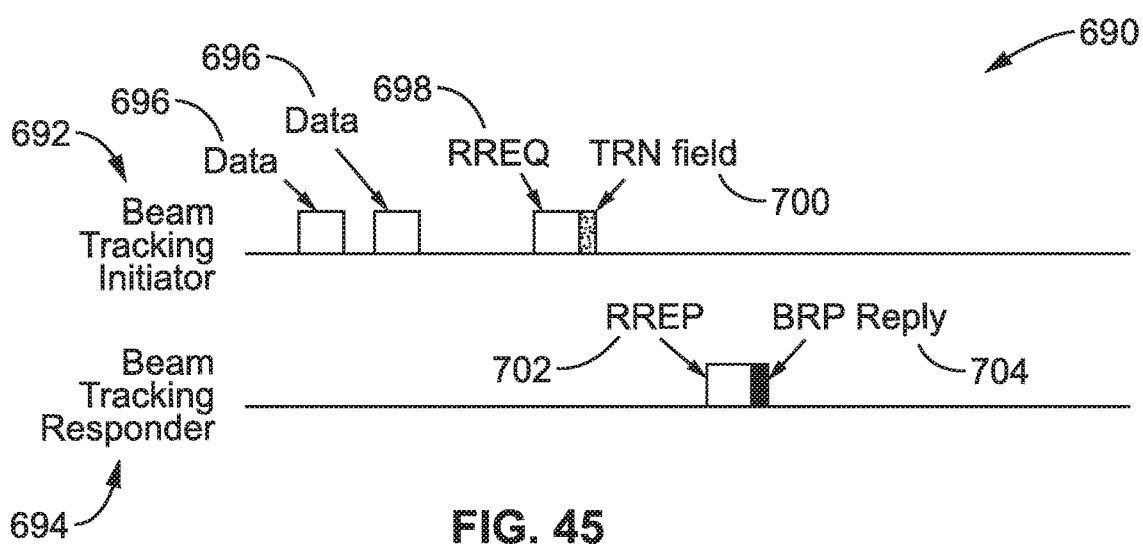
FIG. 45 is a signaling diagram showing a beam tracking initiator and responder communicating routing messages that integrate training and response information for directional sectors of the route according to an embodiment of the present disclosure.

FIG. 45 illustrates an example embodiment 690 of BRP packets that include RREQ and RREP. As a beam tracking initiator 692 sends data 696, it sends an RREQ 698, to which it has appended a BRP training (TRN) field 700. In response to receipt of the above communication, a beam tracking responder 694 sends an RREP 702 to which is appended a BRP reply 704 thus providing beam refinement and passing of the routing messages. The figure graphically demonstrates an example of exchange of frames between the initiator and responder. In the example shown it is assumed that the responder has valid routing information to reply to the initiator, whereby it appends BRP feedback frame to the RREP frame and responds to the initiator. In this way, the two STAs exchange the BRP frames and at the same time they exchange the routing control frames.

5.3.1. Beam Refinement Protocol Explained

This section describes beam refinement aspects adopted from and based on the IEEE 802.11 ay D2.0 Standard draft and the following paper "Da Silva C R, Kosloff J, Chen C, Lomayev A, Cordeiro C. Beamforming Training for IEEE 802.11 ay Millimeter Wave Systems. In 2018 Information Theory and Applications Workshop (ITA) 2018 Feb. 11 (pp. 1-9), IEEE".

In this section, the main principles of beam refinement protocol are described which are similar to the IEEE 802.11ad/ay standard. Beam refinement protocol (BRP) packets contain a TRN field that enable fine tuning and/or optimization of antenna settings for transmission and reception. BRP-TX packets are used for transmit antenna weight vector (AWV) fine tuning. BRP-RX packets are used for reception antenna weight vector (AWV) training. There is a possibility for simultaneous training of transmit and reception training (fine tuning) of AWV by using BRP-TX/RX packets.

5.3.1.1. TRN Field

FIG. 46 and FIG. 47 illustrate an example embodiment 710, 730 of a TRN field added to the data frame, and its composition of the BRP TX packet, to which at least one embodiment of the present disclosure has been made compatible. The present TRN field enables the transmit/receive AWV optimization used by the STAs. In FIG. 46 a TRN field 710 is shown appended to a regular frame shown having fields, STF, CE, Header, Data, AGC, and TRN-R/T. It will be noted that the frame which contains BRP fields is termed a BRP packet. In FIG. 47 the composition 730 of these TRN units 732a (unit 1), 732b (unit 2) through 732n (unit L) are shown, each comprising P repetitions of TRN subfields, and M repetitions of TRN subfields. Either transmitter of the BRP packet or receiver of the BRP packet changes its AWV for each TRN field, and the receiver measures which AWV provides better signal reception. When the BRP-RX is transmitted, the receiver changes its receiving AWV for each TRN field. The receiver compares signal quality among TRN fields, and selects the AWV which is used for the best quality TRN field to be the up-to-date AWV for use. When BRP-TX packets are transmitted, the transmitter changes its transmitting AWV for each TRN field. The receiver of the packet evaluates signal quality among TRN fields without changing its receiving AWV, and feeds back the best AWV information to the transmitter. Then, the transmitter will consider the reported AWV to be the up-to-date AWV for use.

As was seen in FIG. 47 the TRN field of the BRP-TX packet contains several TRN-Units, and each TRN-Unit contains P+M repetitions of the TRN subfields. The values of P and M are defined and included in the TRN-Unit field. In this case, the first P TRN subfields of the each TRN-Unit uses the same AWV as the preamble and data, except for when the antenna used to transmit the BRP-TX packet changes at the beginning of the TRN field. In the transmission of other M TRN subfields, the STA may change the antenna settings to try different AWV while the receive AWV setting is fixed on the other peer STA.

FIG. 48 illustrates an example embodiment 750 of a TRN field in the BRP-RX packet to which embodiments of the present disclosure can be made compatible. In this case, each TRN-Unit 752a, 752b through 752n, consists of 10 TRN subfields. All TRN subfields included in the TRN field are transmitted with the same AWV as the preamble and data. This provides the peer STA a reference to determine an improved receive AWV setting.

Therefore, the present disclosure has taught maintaining some level of compatibility with existing BRP protocols while teaching integration with route discovery (e.g., RREQ and RREP message) as shown in FIG. 45. Therefore, the STAs would be able to perform the route discovery while they are able to fine tune their antenna settings.

5.3.2. Beam Tracking Initiator

Figure 49:
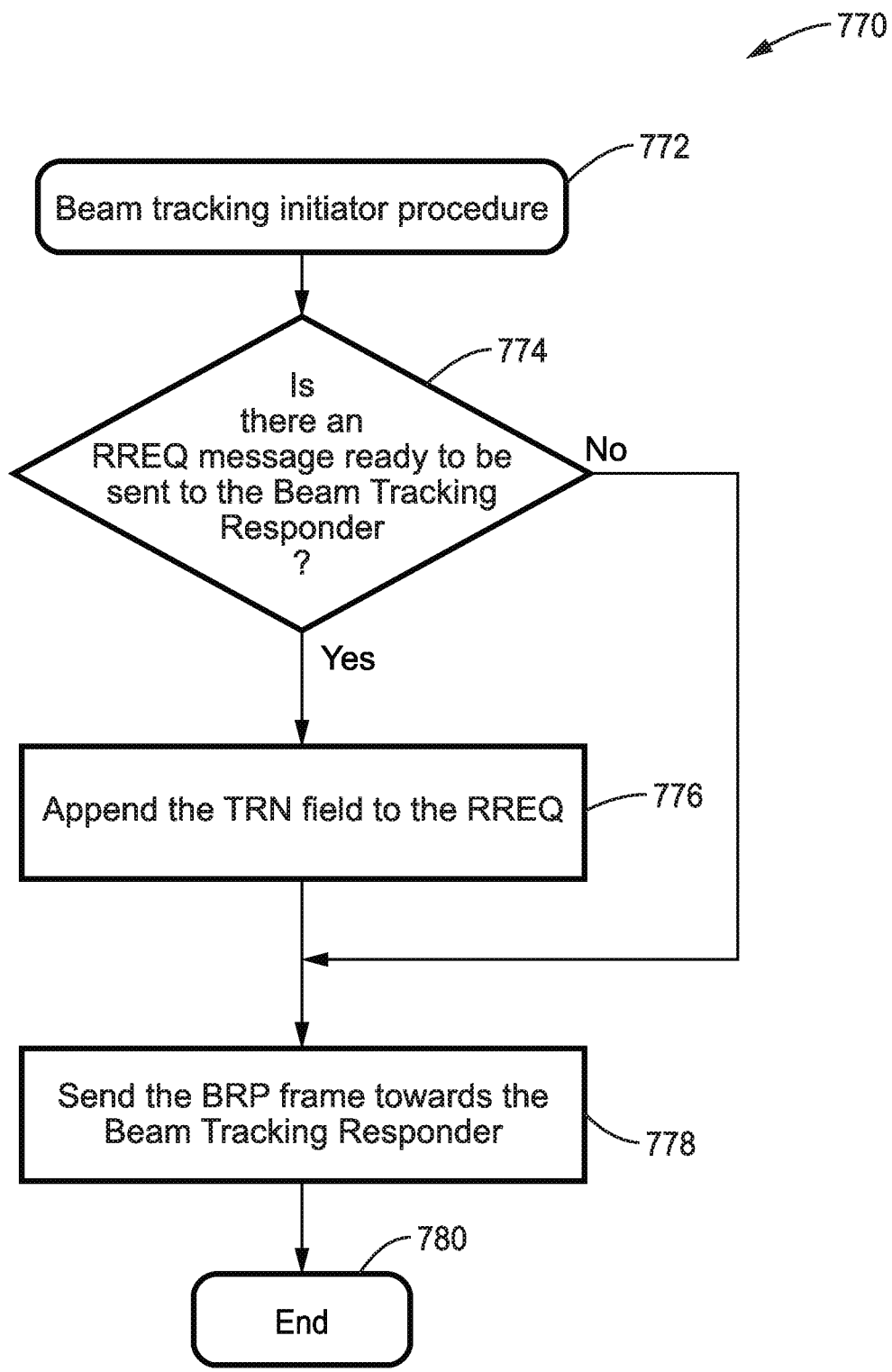
FIG. 49 is a flow diagram of transmitting a route request with appended (TRN) field according to an embodiment of the present disclosure.

FIG. 49 illustrates an example embodiment 770 of transmitting an RREQ with TRN field appended to the RREQ frame. There are several ways to trigger a beam refinement procedure, a couple of which are described by example as: (a) using a timer that once it expires, the beam tracking initiator starts the beam refinement process; (b) if the received signal level falls below a certain threshold, then the STA commence a BRP process.

Once the beam tracking is initiated or triggered by the initiator STA, if there is any RREQ frame ready to be sent to the responder STA, then the initiator appends the TRN field to the RREQ frame. This will be the BRP frame sent by the initiator towards the beam tracking responder STA. Then the BRP frame that includes the RREQ as well, is transmitted towards the neighbor STAs.

In particular, the figure depicts the beam tracking initiator procedure commencing 772 and a check being made 774 to determine if there is an RREQ message ready to be sent to the beam tracking responder. If there is an RREQ, then block 776 is reached which appends the TRN field to the RREQ, before proceeding to block 778. Otherwise, if there is no RREQ found at block 774, then execution moves directly to block 778 which sends the BRP frame toward the beam tracking responder before the process ends 780.

5.3.3. Beam Tracking Responder

Figure 50:
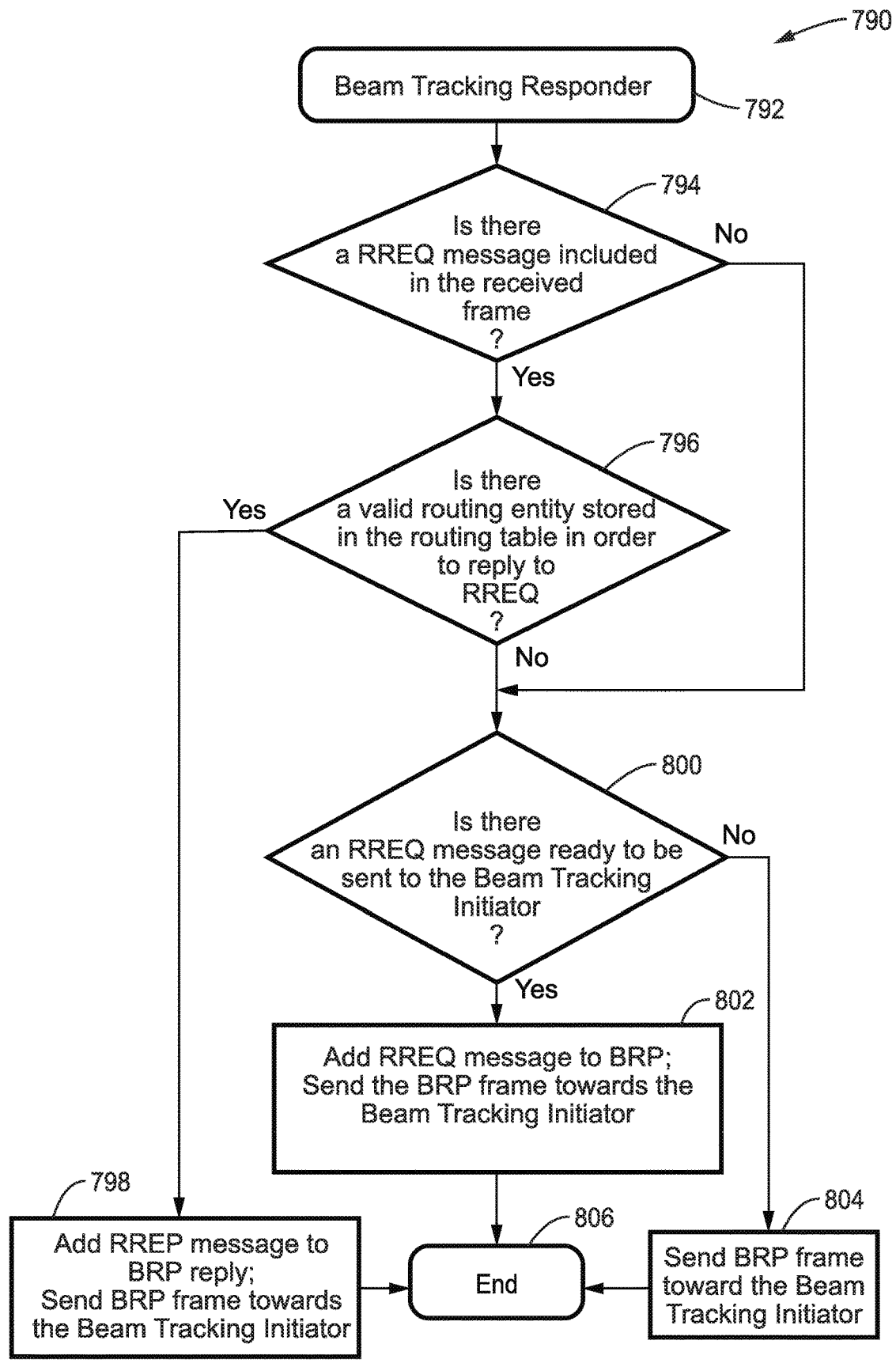
FIG. 50 is a flow diagram of processing a received route request with appended (TRN) field according to an embodiment of the present disclosure.

FIG. 50 illustrates an example embodiment 790 of receiving an RREQ with an incorporated TRN field. Once the neighbor STA receives the BRP frame with TRN field appended, and if the frame contains the RREQ message, then the responder is configured according to the disclosure to take certain actions. First of all, the receiving STA replies to the initiator STA with the beam refinement reply frame. However, the STA may be able to include more information regarding the routing process within the BRP response frame. In particular, there are several cases that can arise, and they are exemplified as follows. (a) If there is valid route information toward the destination STA (according to the routing table), then the neighbor STA appends the BRP frame to the RREP and sends it back to the initiator STA. (b) If there is no valid route information towards the destination STA, but there is an RREQ frame ready to be sent back to the beam tracking initiator STA, then the neighbor STA includes the RREQ within the BRP reply frame and sends it toward the beam tracking initiator. (c) If there is no valid route information towards the destination STA, and also there is no RREQ to be sent towards the beam tracking initiator, then the beam tracking responder just sends the BRP reply frame without any RREQ or RREP messages.

In particular, the figure depicts commencing 792 processing of a received BRP frame and checking 794 if the frame includes an RREQ message. If there is an included RREQ message, then block 796 is reached which performs a check to determine if there is a valid routing entity stored in the routing table in order to reply to the RREQ. If there is a valid routing entity, then block 798 is reached which add an RREP message to the BRP reply and sends the BRP towards the beam tracking initiator before the process ends.

Otherwise, if there is no RREQ message found at block 794, then execution reaches block 800 which checks if there is an RREQ message ready to be sent to the beam tracking initiator. If there is an RREQ to be sent, then block 802 adds the RREQ message to the BRP and sends the BRP frame toward the beam tracking initiator before the process ends 806. Otherwise, if no RREQ is found at block 800 to be sent, then block 804 is reached and the BRP frame is sent towards the beam tracking initiator before processing ends 806.

5.3.4. Example 3: Integrating BRP and RREQ

Again the general topology seen in FIG. 22 is considered having source station STA S 232, destination station STA D 234, STA A 236 and STA B 238. It is assumed in this example that the routing tables of STA A and STA B have up to date routing information toward STA D. The routing table of STA A and STA B, before performing a BRP with STA S, are seen in Table 28 and Table 29, respectively.

In this case it is assumed that STA S has already performed SSW with STA A and STA B. However, STA S requires performing a beam refinement process with STA A and STA B. This could, for example, arise due to the need for more optimization in antenna settings at STA S. Moreover, STA S does not have valid route information towards destination STA D. In this case, STA S needs to discover routes towards STA D, and accordingly STA S sends RREQ to its neighbor STAs, which are STA A and STA B. In this case, STA S integrates the RREQ with BRP frame and sends it towards STA A and STA B.

FIG. 51 illustrates an example embodiment 810 of RREQ and RREP integrated with BRP frames between STA S 232 and STA A 236 performing the exchange over beamformed link 812, 814 previously established (e.g., by SSW). The RREQ with TRN is seen 812 from STA S 232, with a response 814 from STA A exchanging the RREP and BRP reply back to STA S.

FIG. 52 illustrates an example embodiment 830 integrating RREQ and RREP with BRP frames between STA S and STA B. Thus in this figure we seen the next step in which STA S performs the BRP with STA B. STA S 232 and STA B 238 perform the exchange over beamformed link 832, 834 previously established (e.g., by SSW). The RREQ with TRN is seen 832 from STA S 232, with a response 834 from STA B exchanging the RREP and BRP reply back to STA S.

As a result of this BRP operation, STA S updates its routing table towards STA A, STA B, and STA D, as shown in Table 30.

Once STA S performs the BRP with STA A and STA B, these stations also receive information about the link metric between themselves and STA S. Therefore, STA A and STA B also update their routing tables as seen in Table 31 and Table 32.

5.4. Separating Sector Sweep and Route Discovery Process

In previous sections, it was discussed how sector sweep and route discovery processes were integrated by embedding RREQ/RREP messages inside of the sector sweep frames, and also how beam refinement was integrated with the exchange of RREQ/RREP messages.

In this section, it is described how the integration can be relaxed (partially decoupled) between the sector sweep and route discovery processes. In this process sector sweep is performed followed by communication of RREQ/RREP, in particular, exchanging RREQ/RREP messages using the best sector that is obtained from the sector sweep operation.

The same topology is being considered as was shown in FIG. 22, showing four stations STA S 232, STA D 234, STA A 236 and STA B 238.

It is assumed that the metric of the links is bidirectional, meaning that the metric of STA A to STA B is the same as from STA B to STA A. It is also assume that the STAs perform sector sweep with their neighbor STAs.

FIG. 53 illustrates an example embodiment 850 of a sector sweep 852 from STA S 232 and sector sweep 854 back from STA A 236.

FIG. 54 illustrates an example embodiment 870 of a sector sweep 872 from STA S 232 and sector sweep 874 back from STA B 238.

After the sector sweep, each STA stores the best sector information about its neighbor STAs. As a result of the antenna sector sweep, each STA builds a database called a Neighbor List and stores in its memory received signal quality info per STA and per TX antenna sector. Each instance of the Neighbor List stores miscellaneous information on the neighbor STA. The purpose of the Neighbor List is that each STA maintains awareness of its neighbor STAs and also information about their best transmit/receive sectors.

Figure 55:
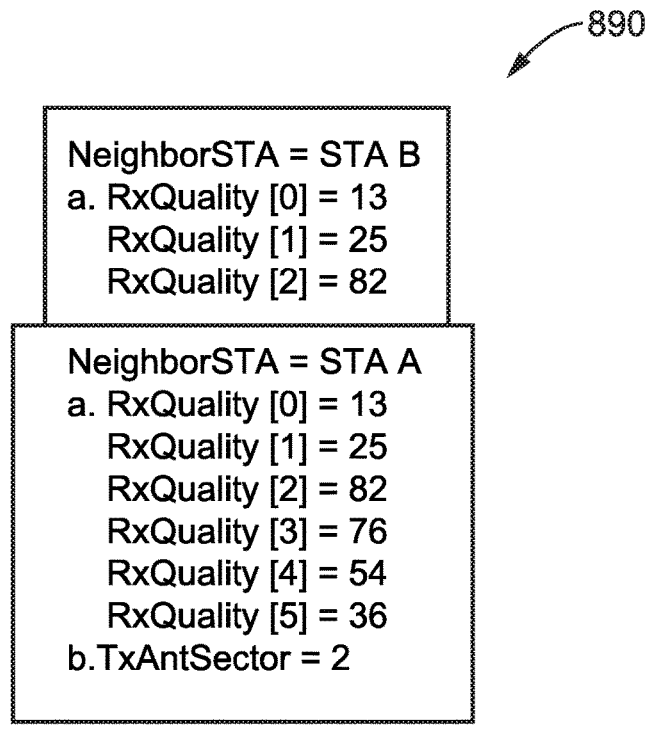
FIG. 55 is a data base record diagram of an example neighbor list at station S that recognizes neighbor stations A and B according to an embodiment of the present disclosure.

FIG. 55 illustrates an example embodiment 890 of a Neighbor List. In the example shown only two neighbors (STA A and STA B) are seen for STA S according to the topology example. For the sake of simplicity of illustration each station is considered to only have six antenna sectors, however, the present disclosure can be configured to maintain information about any desired number of neighboring stations, each of which has any desired number of antenna sectors. The depicted Neighbor List constructed by STA S recognizes STA A and STA B as its immediate neighbor STAs (one-hop neighbors), and creates two instances (records) of Neighbor List entries. STA S stores receive link quality information to RxQuality[N], where N is associated with Tx Antenna Sector of the neighbor STA. In the Neighbor List TxAntSector for each instance of the Neighbor List is denoted the best transmit sector towards that neighbor STA.

Once STA S learns about the best TX and RX sector towards its neighbor STAs, it uses the TxAntSector to transmit the RREQ frame towards its neighbor STAs.

Figures 56, 57:
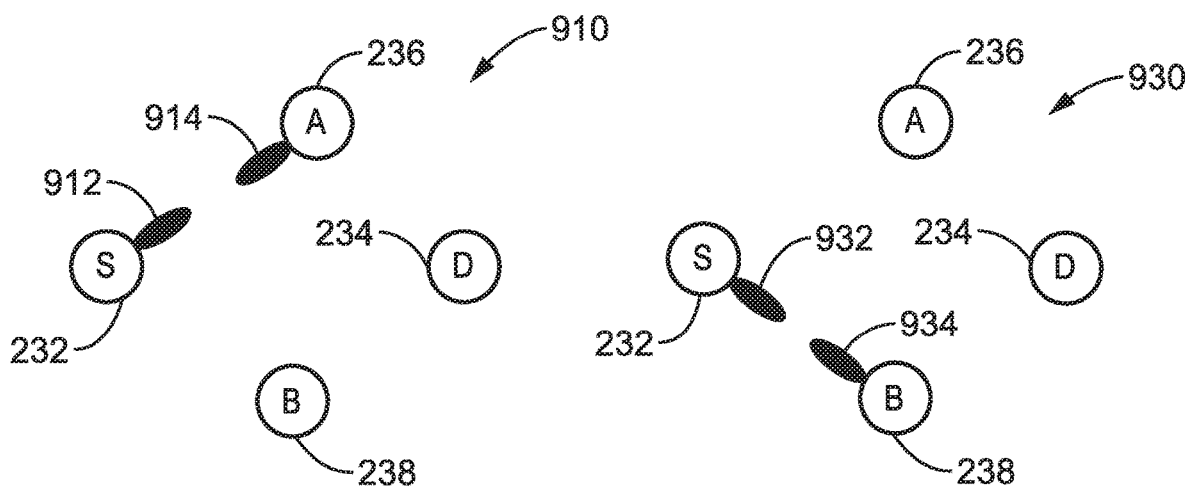
FIG. 56 is a network topology diagram showing a routing request communicated over an established link between station S and station A using best sector from sector sweeping according to an embodiment of the present disclosure.
FIG. 57 is a network topology diagram showing a routing request communicated over an established link between station S and station B using best sector from sector sweeping according to an embodiment of the present disclosure.

FIG. 56 and FIG. 57 illustrate example embodiments 910, 930 of an RREQ frame being transmitted using the best sector obtained from sector sweep operation between STA S and STA A, and STA S and STA B, respectively. In FIG. 56 an RREQ is transmitted from STA S 232 and STA A 236 using the best sectors 912, 914 obtained from SSW. Similarly, in FIG. 57 an RREQ is transmitted from STA S 232 and STA B 238 using the best sectors 932, 934 obtained from SSW. Thus, in this case, STA S is sending a RREQ message towards STA A and STA B.

As a result of this frame exchange, STA S updates its forwarding table to account for the forwarding operation of RREQ towards STA A and STA B, which is seen in forwarding Table 33.

As a result of the RREQ frame exchange, STA A and STA B receive RREQ messages and they estimate the link metric. Therefore, STA A and STA B are able to update their routing table towards STA S, as seen in the updated routing tables of Table 34 and Table 35.

The process of performing sector sweep between STAs continues and each STA populates its Neighbor List towards its one-hop neighbor STAs. The exchange of the route discovery messages (RREQ and RREP) follow the process of sector sweeping, with RREQ and RREP messages being transmitted using the best sector that is discovered in the sector sweep process.

The process of populating routing tables at all nodes, such that the routing tables preferably include a backup next-hop option to reach to the destination STAs.

5. Summary of Disclosure Elements

The following summary discloses certain important elements of the instant disclosure, however the summary is not to be construed as describing the only important elements of the disclosure.

An apparatus and method for combining sector sweep training, as is needed for directional communications systems, with route request and route reply message propagation, which is needed to establish the route from an originating STA toward a destination STA.

Sector sweep and route discovery are integrated such that the route discovery will trigger the sector sweep operation. In that case, if the sector sweep has already been performed for a link (i.e., up-to-date information is available), then the route discovery process falls back to the conventional method by which the route discovery requests and route reply messages are sent over the best sector and the established directional link between two nodes.

An apparatus and method are described to combine beam refinement (optimizing sector settings between STAs) and route discovery processes. In one embodiment training fields are attached route discovery messages, with the responder appending a beam refinement reply to a routing reply.

An apparatus and method are described in which the route discovery process is achieved on top of an established directional link, assuming that STAs have performed the sector sweep training.

The apparatus and method can be utilized with protocols which are configured for establishing and maintaining a primary and one or more backup routes from a source to a destination station.

The apparatus and method can be utilized with protocols which utilize status request and status reply messages for maintaining routing information.

The apparatus and method can be utilized with directional wireless communication stations which are in the millimeter wave bands, and that may also provide for Omni-directional communications in another band.

6. General Scope of Embodiments

The enhancements described in the presented technology can be readily implemented within the protocols of various wireless communication stations. It should also be appreciated that wireless communication stations are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in every one of the diagrams for the sake of simplicity of illustration, as one of ordinary skill in the art recognizes the use of computer devices for carrying out steps involved with controlling a wireless communication station. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following.

1. An apparatus for wireless communication in a network, the apparatus comprising: (a) a station comprising a directional wireless communication circuit configured for wirelessly communicating directly, or through one or more hops, to at least one other directional wireless communication circuit; (b) a processor within said wireless communication circuit configured for controlling station operations over a wireless network; (c) a non-transitory memory storing instructions executable by the processor; and (d) wherein said instructions, when executed by the processor, perform steps comprising: (d)(i) performing as a route request initiator station and initiating a route request discovery process, comprising: (d)(i)(A) performing a combined sector sweep (SSW) and route discovery operation if the station lacks sector information for its neighbor stations; (d)(i)(B) performing said sector sweep (SSW) by transmitting sector sweep (SSW) frames across multiple sector directions from said directional wireless communication circuit to find the best direction to communicate with neighboring stations; (d)(i)(C) appending a route request (RREQ) message into each of said sector sweep (SSW) frames being transmitted across multiple sector directions; (d)(i)(D) receiving and processing sector sweep (SSW) frames from neighboring stations, and processing any incorporated route request (RREQ) or route reply (RREP) message contents; (d)(ii) performing as a route request responder station in responding to a route request discovery process from a route request initiator station, comprising: (d)(ii)(A) responding to one or more received sector sweep (SSW) frames from a neighboring station by transmitting sector sweep (SSW) frames across multiple sector directions; (d)(ii)(B) appending a route reply (RREP) message to each of the transmitted sector sweep (SSW) frames, in response to detecting and processing a route request (RREQ) message appended to the one or more received sector sweep (SSW) frames if there is a valid route to reply to the route request (RREQ) message; (d)(ii)(C) appending a route reply (RREQ) message to each of the transmitted sector sweep (SSW) frames, in response to detecting and processing a route request (RREQ) message appended to the one or more received sector sweep (SSW) frames if there is not a valid route to reply to the route request (RREQ) message, and there is a route request (RREQ) message to be sent to a neighboring station; and (d)(iii) establishing a route from the route request initiator station through one or more route request responder stations to a destination station that may comprise one of the route request responder stations.

2. A method of performing wireless communication in a network, comprising steps of: (a) wirelessly communicating from a station comprising a directional wireless communication circuit to at least one other directional wireless communication circuit, and operating as a route request initiator station, route request responder station, or destination station, toward establishing either a direct route, or indirect route through one or more hops, from the route request initiator station and destination station; (b) performing as a route request initiator station and initiating a route request discovery process, comprising: (b)(i) performing a combined sector sweep (SSW) and route discovery operation if the station lacks sector information for its neighbor stations; (b)(ii) performing said sector sweep (SSW) by transmitting sector sweep (SSW) frames across multiple sector directions from said directional wireless communication circuit to find the best direction to communicate with neighboring stations; (b)(iii) appending a route request (RREQ) message into each of said sector sweep (SSW) frames being transmitted across multiple sector directions; (b)(iv) receiving and processing sector sweep (SSW) frames from neighboring stations, and processing any incorporated route request (RREQ) or route reply (RREP) message contents; (c) performing as a route request responder station in responding to a route request discovery process from a route request initiator station, comprising: (c)(i) responding to one or more received sector sweep (SSW) frames from a neighboring station by transmitting sector sweep (SSW) frames across multiple sector directions; (c)(ii) appending a route reply (RREP) message to each of the transmitted sector sweep (SSW) frames, in response to detecting and processing a route request (RREQ) message appended to the one or more received sector sweep (SSW) frames if there is a valid route to reply to the route request (RREQ) message; (c)(iii) appending a route reply (RREQ) message to each of the transmitted sector sweep (SSW) frames, in response to detecting and processing a route request (RREQ) message appended to the one or more received sector sweep (SSW) frames if there is not a valid route to reply to the route request (RREQ) message, and there is a route request (RREQ) message to be sent to a neighboring station; and (d) establishing a route from the route request initiator station through one or more route request responder stations to a destination station that may comprise one of the route request responder stations.

3. The apparatus or method of any preceding embodiment, wherein said instructions when executed by the processor further perform one or more steps comprising tracking link metrics on one or more received sector sweep frames, and communicating the link metrics to the station transmitting the one or more received sector sweep frames.

4. The apparatus or method of any preceding embodiment, wherein said instructions when executed by the processor perform communicating of link metrics in response to transmission of routing request (RREQ) and routing reply (RREP) messages.

5. The apparatus or method of any preceding embodiment, wherein said instructions when executed by the processor when performing as a route request responder station responding to a route request discovery process from which it receives multiple routing request (RREQs) selects the routing request having the best link metrics to be forwarded on to a neighboring or destination station.

6. The apparatus or method of any preceding embodiment, wherein said instructions when executed by the processor further perform one or more steps comprising tracking link metrics on one or more received sector sweep frames, and using said link metrics in selecting a best sector direction for communicating with the station transmitting the one or more received sector sweep frames.

7. The apparatus or method of any preceding embodiment, wherein said instructions when executed by the processor further comprises establishing a directional communication link between this station and a neighboring station in response to sector sweep and route discovery operations.

8. The apparatus or method of any preceding embodiment, wherein said instructions when executed by the processor further comprises performing a beam refinement protocol (BRP) upon the directional communication link between this station and a neighboring station to further tune the direction sector settings.

9. The apparatus or method of any preceding embodiment, wherein said instructions when executed by the processor performs said beam refinement protocol (BRP) when a beam tracking initiator appends a training (TRN) field onto a routing request (RREQ) message to the neighboring station.

10. The apparatus or method of any preceding embodiment, wherein said instructions when executed by the processor performs responding as a beam tracking responder which appends a beam refinement protocol (BRP) reply onto a routing reply (RREP) message.

11. The apparatus or method of any preceding embodiment, wherein said instructions when executed by the processor performs responding to reception of a route discovery message by either propagating the route discovery message to its neighbor stations if the station receiving the route discovery message is not the destination of the wireless communication; or sending out a route reply message to a station from which the route discovery message was received if the station receiving the route discovery message is the destination of the wireless communication.

12. The apparatus or method of any preceding embodiment, wherein said instructions when executed by the processor performs propagating route reply messages to neighbor stations until one or more route reply messages, through one or more paths, is received by the originating station as the station which originally transmitted the route discovery messages.

13. The apparatus or method of any preceding embodiment, wherein said wireless communication circuit comprises a millimeter wave (mmW) station configured for directional communications in both mesh networks and non-mesh networks.

14. The apparatus or method of any preceding embodiment, wherein said instructions when executed by the processor further comprises ranking multiple route requests based on their link metric in selecting a primary next-hop station and at least one backup next-hop station if these stations are available.

15. The apparatus or method of any preceding embodiment, wherein said wireless communication circuit is configured with directional communications on a first band and for quasi-Omni directional communications on a second band.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Empty Routing Table at STA S

| Destination | A | B | D |
|---|---|---|---|
| NextHop | N/A | N/A | N/A |
| Metric | N/A | N/A | N/A |
| Lifetime | N/A | N/A | N/A |
| Backup NextHop | N/A | N/A | N/A |
| Backup Metric | N/A | N/A | N/A |
| Backup Lifetime | N/A | N/A | N/A |

TABLE 2

STA A Routing Table before SSW with STA S

| Destination | S | B | D |
|---|---|---|---|
| NextHop | N/A | B | D |
| Metric | N/A | 2 | 3 |
| Lifetime | N/A | 999 | 999 |
| Backup NextHop | N/A | N/A | B |
| Backup Metric | N/A | N/A | 5 |
| Backup Lifetime | N/A | N/A | N/A |

TABLE 3

STA B Routing Table before SSW with STA S

| Destination | S | A | D |
|---|---|---|---|
| NextHop | N/A | A | D |
| Metric | N/A | 2 | 3 |
| Lifetime | N/A | 999 | 999 |
| Backup NextHop | N/A | N/A | A |
| Backup Metric | N/A | N/A | 5 |
| Backup Lifetime | N/A | N/A | N/A |

TABLE 4

STA S Routing Table after exchanging SSW frames with STAs A & B

| Destination | A | B | D |
|---|---|---|---|
| NextHop | A | B | D |
| Metric | 5 | 4 | 7 |
| Lifetime | 999 | 999 | 999 |
| Backup NextHop | N/A | N/A | A |
| Backup Metric | N/A | N/A | 8 |
| Backup Lifetime | N/A | N/A | 999 |

TABLE 5

STA A Routing Table after SSW with STA S

| Destination | S | B | D |
|---|---|---|---|
| NextHop | S | B | D |
| Metric | 5 | 2 | 3 |
| Lifetime | 999 | 999 | 999 |
| Backup NextHop | N/A | N/A | B |
| Backup Metric | N/A | N/A | 5 |
| Backup Lifetime | N/A | N/A | 999 |

TABLE 6

STA B Routing Table after SSW with STA S

| Destination | S | A | D |
|---|---|---|---|
| NextHop | S | A | D |
| Metric | 4 | 2 | 3 |
| Lifetime | 999 | 999 | 999 |
| Backup NextHop | N/A | N/A | A |
| Backup Metric | N/A | N/A | 5 |
| Backup Lifetime | N/A | N/A | 999 |

TABLE 7

| Initial STA A Routing Table | | | |
|---|---|---|---|
| Destination | S | B | D |
| NextHop | N/A | N/A | N/A |
| Metric | N/A | N/A | N/A |
| Lifetime | N/A | N/A | N/A |
| Backup NextHop | N/A | N/A | N/A |
| Backup Metric | N/A | N/A | N/A |
| Backup Lifetime | N/A | N/A | N/A |

TABLE 8

| Initial STA B Routing Table | | | |
|---|---|---|---|
| Destination | S | B | D |
| NextHop | N/A | N/A | N/A |
| Metric | N/A | N/A | N/A |
| Lifetime | N/A | N/A | N/A |
| Backup NextHop | N/A | N/A | N/A |
| Backup Metric | N/A | N/A | N/A |
| Backup Lifetime | N/A | N/A | N/A |

TABLE 9

| Initial STA S Routing Table | | | |
|---|---|---|---|
| Destination | S | B | D |
| NextHop | N/A | N/A | N/A |
| Metric | N/A | N/A | N/A |
| Lifetime | N/A | N/A | N/A |
| Backup NextHop | N/A | N/A | N/A |
| Backup Metric | N/A | N/A | N/A |
| Backup Lifetime | N/A | N/A | N/A |

TABLE 10

| STA S Routing Table after SSW with STA A | | | |
|---|---|---|---|
| Destination | A | B | D |
| NextHop | A | N/A | N/A |
| Metric | 5 | N/A | N/A |
| Lifetime | 999 | N/A | N/A |
| Backup NextHop | N/A | N/A | N/A |
| Backup Metric | N/A | N/A | N/A |
| Backup Lifetime | N/A | N/A | N/A |

TABLE 11

| STA A Routing Table after SSW with STA S | | | |
|---|---|---|---|
| Destination | S | B | D |
| NextHop | S | N/A | N/A |
| Metric | 5 | N/A | N/A |
| Lifetime | 999 | N/A | N/A |
| Backup NextHop | N/A | N/A | N/A |
| Backup Metric | N/A | N/A | N/A |
| Backup Lifetime | N/A | N/A | N/A |

TABLE 12

| STA S Routing Table after SSW with STA B | | | |
|---|---|---|---|
| Destination | A | B | D |
| NextHop | A | B | N/A |
| Metric | 5 | 4 | N/A |
| Lifetime | 999 | 999 | N/A |
| Backup NextHop | N/A | N/A | N/A |
| Backup Metric | N/A | N/A | N/A |
| Backup Lifetime | N/A | N/A | N/A |

TABLE 13

| STA B Routing Table after SSW with STA S | | | |
|---|---|---|---|
| Destination | S | A | D |
| NextHop | S | N/A | N/A |
| Metric | 4 | N/A | N/A |
| Lifetime | 999 | N/A | N/A |
| Backup NextHop | N/A | N/A | N/A |
| Backup Metric | N/A | N/A | N/A |
| Backup Lifetime | N/A | N/A | N/A |

TABLE 14

| STA A Routing Table after SSW with STA B | | | |
|---|---|---|---|
| Destination | S | B | D |
| NextHop | S | B | N/A |
| Metric | 5 | 2 | N/A |
| Lifetime | 999 | 999 | N/A |
| Backup NextHop | B | N/A | N/A |
| Backup Metric | 6 | N/A | N/A |
| Backup Lifetime | 999 | N/A | N/A |

TABLE 15

| STA B Routing Table after SSW with STA A | | | |
|---|---|---|---|
| Destination | S | A | D |
| NextHop | S | A | N/A |
| Metric | 4 | 2 | N/A |
| Lifetime | 999 | 999 | N/A |
| Backup NextHop | A | N/A | N/A |
| Backup Metric | 7 | N/A | N/A |
| Backup Lifetime | 999 | N/A | N/A |

TABLE 16

| STA A Routing Table after SSW with STA D, using Best of RREQ1/RREQ2 | | | |
|---|---|---|---|
| Destination | S | B | D |
| NextHop | S | B | D |
| Metric | 4 | 2 | 3 |
| Lifetime | 999 | 999 | 999 |
| Backup NextHop | B | N/A | N/A |
| Backup Metric | 6 | N/A | N/A |
| Backup Lifetime | 999 | N/A | N/A |

TABLE 17

STA D Routing Table after SSW with STA A

| Destination | S | A | B |
|---|---|---|---|
| NextHop | A | A | N/A |
| Metric | 8 | 3 | N/A |
| Lifetime | 999 | 999 | N/A |
| Backup NextHop | N/A | N/A | N/A |
| Backup Metric | N/A | N/A | N/A |
| Backup Lifetime | N/A | N/A | N/A |

TABLE 18

STA A Routing Table after SSW, using RREQ1, with STA D

| Destination | S | B | D |
|---|---|---|---|
| NextHop | S | N/A | D |
| Metric | 5 | N/A | 3 |
| Lifetime | 999 | N/A | 999 |
| Backup NextHop | N/A | N/A | N/A |
| Backup Metric | N/A | N/A | N/A |
| Backup Lifetime | N/A | N/A | N/A |

TABLE 19

STA D Routing Table after SSW with STA A

| Destination | S | A | B |
|---|---|---|---|
| NextHop | A | A | N/A |
| Metric | 8 | 3 | N/A |
| Lifetime | 999 | 999 | N/A |
| Backup NextHop | N/A | N/A | N/A |
| Backup Metric | N/A | N/A | N/A |
| Backup Lifetime | N/A | N/A | N/A |

TABLE 20

STA A Routing Table after SSW (Fwding RREQ1 received from STA S) w/STA B

| Destination | S | B | D |
|---|---|---|---|
| NextHop | S | B | D |
| Metric | 5 | 2 | 3 |
| Lifetime | 999 | 999 | 999 |
| Backup NextHop | B | N/A | N/A |
| Backup Metric | 6 | N/A | N/A |
| Backup Lifetime | 999 | N/A | N/A |

TABLE 21

STA B Routing Table after SSW (Fwding RREQ2 from STA S) with STA A

| Destination | S | A | D |
|---|---|---|---|
| NextHop | S | A | N/A |
| Metric | 4 | 2 | N/A |
| Lifetime | 999 | 999 | N/A |
| Backup NextHop | A | N/A | N/A |
| Backup Metric | 7 | N/A | N/A |
| Backup Lifetime | 999 | N/A | N/A |

TABLE 22

STA B Routing Table after SSW with STA D

| Destination | S | A | D |
|---|---|---|---|
| NextHop | S | A | D |
| Metric | 4 | 2 | 3 |
| Lifetime | 999 | 999 | 999 |
| Backup NextHop | A | N/A | N/A |
| Backup Metric | 7 | N/A | N/A |
| Backup Lifetime | 999 | N/A | N/A |

TABLE 23

STA D Routing Table after SSW with STA B

| Destination | S | A | B |
|---|---|---|---|
| NextHop | B | A | B |
| Metric | 7 | 3 | 3 |
| Lifetime | 999 | 999 | 999 |
| Backup NextHop | A | N/A | N/A |
| Backup Metric | 8 | N/A | N/A |
| Backup Lifetime | 999 | N/A | N/A |

TABLE 24

STA A Routing Table after RREP from STA B thru beamformed link

| Destination | S | B | D |
|---|---|---|---|
| NextHop | S | B | D |
| Metric | 5 | 2 | 3 |
| Lifetime | 999 | 999 | 999 |
| Backup NextHop | B | N/A | B |
| Backup Metric | 6 | N/A | 5 |
| Backup Lifetime | 999 | N/A | 999 |

TABLE 25

STA B Routing Table after RREP from STA A thru beamformed link

| Destination | S | A | D |
|---|---|---|---|
| NextHop | S | A | D |
| Metric | 4 | 2 | 3 |
| Lifetime | 999 | 999 | 999 |
| Backup NextHop | A | N/A | A |
| Backup Metric | 7 | N/A | 5 |
| Backup Lifetime | 999 | N/A | 999 |

TABLE 26

Updated STA S Routing Table after RREP from STA A

| Destination | A | B | D |
|---|---|---|---|
| NextHop | A | B | A |
| Metric | 5 | 4 | 8 |
| Lifetime | 999 | 999 | 999 |
| Backup NextHop | N/A | N/A | N/A |
| Backup Metric | N/A | N/A | N/A |
| Backup Lifetime | N/A | N/A | N/A |

TABLE 27

Updated STA S Routing Table after RREP from STA B

| Destination | A | B | D |
|---|---|---|---|
| NextHop | A | B | B |
| Metric | 5 | 4 | 7 |
| Lifetime | 999 | 999 | 999 |
| Backup NextHop | N/A | N/A | A |
| Backup Metric | N/A | N/A | 8 |
| Backup Lifetime | N/A | N/A | 999 |

TABLE 28

STA A Routing Table before BRP with STA S

| Destination | S | B | D |
|---|---|---|---|
| NextHop | N/A | B | D |
| Metric | N/A | 2 | 3 |
| Lifetime | N/A | 999 | 999 |
| Backup NextHop | N/A | N/A | B |
| Backup Metric | N/A | N/A | 5 |
| Backup Lifetime | N/A | N/A | 999 |

TABLE 29

STA B Routing Table before BRP with STA S

| Destination | S | A | D |
|---|---|---|---|
| NextHop | N/A | A | D |
| Metric | N/A | 2 | 3 |
| Lifetime | N/A | 999 | 999 |
| Backup NextHop | N/A | N/A | A |
| Backup Metric | N/A | N/A | 5 |
| Backup Lifetime | N/A | N/A | 999 |

TABLE 30

STA S Routing Table after Exchanging BRP frames with STAs A

| Destination | A | B | D |
|---|---|---|---|
| NextHop | A | B | B |
| Metric | 5 | 4 | 7 |
| Lifetime | 999 | 999 | 999 |
| Backup NextHop | N/A | N/A | A |
| Backup Metric | N/A | N/A | 8 |
| Backup Lifetime | N/A | N/A | 999 |

TABLE 31

STA A Routing Table before BRP with STA S

| Destination | S | B | D |
|---|---|---|---|
| NextHop | S | B | D |
| Metric | 5 | 2 | 3 |
| Lifetime | 999 | 999 | 999 |
| Backup NextHop | N/A | N/A | B |
| Backup Metric | N/A | N/A | 5 |
| Backup Lifetime | N/A | N/A | 999 |

TABLE 32

STA B Routing Table before BRP with STA S

| Destination | S | A | D |
|---|---|---|---|
| NextHop | S | A | D |
| Metric | 4 | 2 | 3 |
| Lifetime | 999 | 999 | 999 |
| Backup NextHop | N/A | N/A | A |
| Backup Metric | N/A | N/A | 5 |
| Backup Lifetime | N/A | N/A | 999 |

TABLE 33

Forwarding Table at STA S

| Next Hop | A | B |
|---|---|---|
| Originating STA | S | S |
| Sequence Number | 0 | 0 |
| Type | RREQ | RREQ |
| Metric | N/A | N/A |

TABLE 34

STA A Routing Table after RREQ from STA S

| Destination | S | B | D |
|---|---|---|---|
| NextHop | S | N/A | N/A |
| Metric | 5 | N/A | N/A |
| Lifetime | 999 | N/A | N/A |
| Backup NextHop | N/A | N/A | N/A |
| Backup Metric | N/A | N/A | N/A |
| Backup Lifetime | N/A | N/A | N/A |

TABLE 35

STA B Routing Table after RREQ from STA S

| Destination | S | A | D |
|---|---|---|---|
| NextHop | S | N/A | N/A |
| Metric | 4 | N/A | N/A |
| Lifetime | 999 | N/A | N/A |
| Backup NextHop | N/A | N/A | N/A |
| Backup Metric | N/A | N/A | N/A |
| Backup Lifetime | N/A | N/A | N/A |

What is claimed is:

1. An apparatus for wireless communication in a network, the apparatus comprising:
   (a) a station comprising a directional wireless communication circuit configured for wirelessly communicating directly, or through one or more hops, to at least one other directional wireless communication circuit;
   (b) a processor within said wireless communication circuit configured for controlling station operations over a wireless network;
   (c) a non-transitory memory storing instructions executable by the processor; and
   (d) wherein said instructions, when executed by the processor, perform steps comprising:
      (i) performing as a route request initiator station and initiating a route request discovery process, comprising:
         (A) performing a combined sector sweep (SSW) and route discovery operation if the station lacks sector information for its neighbor stations;

(B) performing said sector sweep (SSW) by transmitting sector sweep (SSW) frames across multiple sector directions from said directional wireless communication circuit to find the best direction to communicate with neighboring stations;

(C) appending a route request (RREQ) message into each of said sector sweep (SSW) frames being transmitted across multiple sector directions;

(D) receiving and processing sector sweep (SSW) frames from neighboring stations, and processing any incorporated route request (RREQ) or route reply (RREP) message contents;

(ii) performing as a route request responder station in responding to a route request discovery process from a route request initiator station, comprising:

(A) responding to one or more received sector sweep (SSW) frames from a neighboring station by transmitting sector sweep (SSW) frames across multiple sector directions;

(B) appending a route reply (RREP) message to each of the transmitted sector sweep (SSW) frames, in response to detecting and processing a route request (RREQ) message appended to the one or more received sector sweep (SSW) frames if there is a valid route to reply to the route request (RREQ) message;

(C) appending a route reply (RREQ) message to each of the transmitted sector sweep (SSW) frames, in response to detecting and processing a route request (RREQ) message appended to the one or more received sector sweep (SSW) frames if there is not a valid route to reply to the route request (RREQ) message, and there is a route request (RREQ) message to be sent to a neighboring station;

(iii) establishing a route from the route request initiator station through one or more route request responder stations to a destination station that may comprise one of the route request responder stations; and (iv) establishing a directional communication link between this station and a neighboring station in response to sector sweep and route discovery operations;

(v) performing a beam refinement protocol (BRP) upon the directional communication link between this station and a neighboring station to further tune the direction sector settings; and (vi) performing said beam refinement protocol (BRP) when a beam tracking initiator appends a training (TRN) field onto a routing request (RREQ) message to the neighboring station.

2. The apparatus of claim 1, wherein said instructions when executed by the processor further perform one or more steps comprising tracking link metrics on one or more received sector sweep frames, and communicating the link metrics to the station transmitting the one or more received sector sweep frames.

3. The apparatus of claim 2, wherein said instructions when executed by the processor perform communicating of link metrics in response to transmission of routing request (RREQ) and routing reply (RREP) messages.

4. The apparatus of claim 3, wherein said instructions when executed by the processor when performing as a route request responder station responding to a route request discovery process from which it receives multiple routing request (RREQs) selects the routing request having the best link metrics to be forwarded on to a neighboring or destination station.

5. The apparatus of claim 1, wherein said instructions when executed by the processor further perform one or more steps comprising tracking link metrics on one or more received sector sweep frames, and using said link metrics in selecting a best sector direction for communicating with the station transmitting the one or more received sector sweep frames.

6. The apparatus of claim 1, wherein said instructions when executed by the processor performs responding as a beam tracking responder which appends a beam refinement protocol (BRP) reply onto a routing reply (RREP) message.

7. The apparatus of claim 1, wherein said instructions when executed by the processor performs responding to reception of a route discovery message by either propagating the route discovery message to its neighbor stations if the station receiving the route discovery message is not the destination of the wireless communication; or sending out a route reply message to a station from which the route discovery message was received if the station receiving the route discovery message is the destination of the wireless communication.

8. The apparatus of claim 1, wherein said instructions when executed by the processor performs propagating route reply messages to neighbor stations until one or more route reply messages, through one or more paths, is received by the originating station as the station which originally transmitted the route discovery messages.

9. The apparatus of claim 1, wherein said wireless communication circuit comprises a millimeter wave (mmW) station configured for directional communications in both mesh networks and non-mesh networks.

10. The apparatus of claim 1, wherein said instructions when executed by the processor further comprises ranking multiple route requests based on their link metric in selecting a primary next-hop station and at least one backup next-hop station if these stations are available.

11. The apparatus of claim 1, wherein said wireless communication circuit is configured with directional communications on a first band and for quasi-Omni directional communications on a second band.

12. An apparatus for wireless communication in a network, the apparatus comprising:

(a) a station comprising a directional wireless communication circuit configured for wirelessly communicating directly, or through one or more hops, to at least one other directional wireless communication circuit;

(b) a processor within said wireless communication circuit configured for controlling station operations over a wireless network;

(c) a non-transitory memory storing instructions executable by the processor; and (d) wherein said instructions, when executed by the processor, perform steps comprising:

(i) performing as a route request initiator station and initiating a route request discovery process, comprising:

(A) performing a combined sector sweep (SSW) and route discovery operation if the station lacks sector information for its neighbor stations;

(B) performing said sector sweep (SSW) by transmitting sector sweep (SSW) frames across multiple sector directions from said directional wireless communication circuit to find the best direction to communicate with neighboring stations;

(C) appending a route request (RREQ) message into each of said sector sweep (SSW) frames being transmitted across multiple sector directions;

(D) receiving and processing sector sweep (SSW) frames from neighboring stations, and processing any incorporated route request (RREQ) or route reply (RREP) message contents;

(ii) performing as a route request responder station in responding to a route request discovery process from a route request initiator station, comprising:

(A) tracking link metrics on one or more received sector sweep frames, and communicating the link metrics to the station transmitting the one or more received sector sweep frames from a neighboring station by transmitting sector sweep (SSW) frames across multiple sector directions to which are appended a routing request (RREQ) or routing reply (RREP) message containing the link metrics;

(B) appending a route reply (RREP) message to each of the transmitted sector sweep (SSW) frames, in response to detecting and processing a route request (RREQ) message appended to the one or more received sector sweep (SSW) frames if there is a valid route to reply to the route request (RREQ) message;

(C) appending a route reply (RREQ) message to each of the transmitted sector sweep (SSW) frames, in response to detecting and processing a route request (RREQ) message appended to the one or more received sector sweep (SSW) frames if there is not a valid route to reply to the route request (RREQ) message, and there is a route request (RREQ) message to be sent to a neighboring station; and (iii) establishing a route from the route request initiator station through one or more route request responder stations to a destination station that may comprise one of the route request responder stations; and (iv) performing a beam refinement protocol (BRP) upon the directional communication link between this station and a neighboring station to further tune the direction sector settings when a beam tracking initiator appends a training (TRN) field onto a routing request (RREQ) message to the neighboring station.

13. The apparatus of claim 12, wherein said instructions when executed by the processor performs responding as a beam tracking responder which appends a beam refinement protocol (BRP) reply onto a routing reply (RREP) message.

14. The apparatus of claim 12, wherein said instructions when executed by the processor performs responding to reception of a route discovery message by either propagating the route discovery message to its neighbor stations if the station receiving the route discovery message is not the destination of the wireless communication; or sending out a route reply message to a station from which the route discovery message was received if the station receiving the route discovery message is the destination of the wireless communication.

15. A method of performing wireless communication in a network, comprising steps of:

(a) wirelessly communicating from a station comprising a directional wireless communication circuit to at least one other directional wireless communication circuit, and operating as a route request initiator station, route request responder station, or destination station, toward establishing either a direct route, or indirect route through one or more hops, from the route request initiator station and destination station;

(b) performing as a route request initiator station and initiating a route request discovery process, comprising:

(i) performing a combined sector sweep (SSW) and route discovery operation if the station lacks sector information for its neighbor stations;

(ii) performing said sector sweep (SSW) by transmitting sector sweep (SSW) frames across multiple sector directions from said directional wireless communication circuit to find the best direction to communicate with neighboring stations;

(iii) appending a route request (RREQ) message into each of said sector sweep (SSW) frames being transmitted across multiple sector directions;

(iv) receiving and processing sector sweep (SSW) frames from neighboring stations, and processing any incorporated route request (RREQ) or route reply (RREP) message contents;

(c) performing as a route request responder station in responding to a route request discovery process from a route request initiator station, comprising:

(i) responding to one or more received sector sweep (SSW) frames from a neighboring station by transmitting sector sweep (SSW) frames across multiple sector directions;

(ii) appending a route reply (RREP) message to each of the transmitted sector sweep (SSW) frames, in response to detecting and processing a route request (RREQ) message appended to the one or more received sector sweep (SSW) frames if there is a valid route to reply to the route request (RREQ) message;

(iii) appending a route reply (RREQ) message to each of the transmitted sector sweep (SSW) frames, in response to detecting and processing a route request (RREQ) message appended to the one or more received sector sweep (SSW) frames if there is not a valid route to reply to the route request (RREQ) message, and there is a route request (RREQ) message to be sent to a neighboring station; and (d) establishing a route from the route request initiator station through one or more route request responder stations to a destination station that may comprise one of the route request responder stations;

(e) establishing a directional communication link between this station and a neighboring station in response to sector sweep and route discovery operations;

(f) performing a beam refinement protocol (BRP) upon the directional communication link between this station and a neighboring station to further tune the direction sector settings; and (g) performing said beam refinement protocol (BRP) when a beam tracking initiator appends a training (TRN) field onto a routing request (RREQ) message to the neighboring station.

16. The method of claim 15, further comprising performing one or more steps for tracking link metrics on one or more received sector sweep frames, and communicating the link metrics to the station transmitting the one or more received sector sweep frames.

17. The method of claim 15, further comprising communicating of link metrics in response to transmission of routing request (RREQ) and routing reply (RREP) messages.

18. The method of claim 15, further comprising selecting the routing request having the best link metrics to be forwarded on to a neighboring or destination station, by a station responding to a route request discovery process from which it receives multiple routing request (RREQs).

19. The method of claim 15, further comprising tracking link metrics on one or more received sector sweep frames, and using said link metrics in selecting a best sector direction for communicating with the station transmitting the one or more received sector sweep frames.

20. The method of claim 15, further comprising responding as a beam tracking responder in appending a beam refinement protocol (BRP) reply onto a routing reply (RREP) message.

\* \* \* \* \*